(12) United States Patent
Watford et al.

(10) Patent No.: US 12,509,987 B2
(45) Date of Patent: Dec. 30, 2025

(54) CONTINUOUS CHARACTERIZATION AND COMMUNICATION OF CHEMICAL TRACER

(71) Applicant: Patina LLC, Houston, TX (US)

(72) Inventors: Jason Michael Watford, Houston, TX (US); John Jeffrey Pechiney, Houston, TX (US)

(73) Assignee: Patina IP LLC, Houston, TX (US)

( * ) Notice: Subject to any disclaimer, the term of this patent is extended or adjusted under 35 U.S.C. 154(b) by 40 days.

(21) Appl. No.: 18/108,303

(22) Filed: Feb. 10, 2023

(65) Prior Publication Data

US 2023/0296018 A1 Sep. 21, 2023

Related U.S. Application Data

(60) Provisional application No. 63/358,541, filed on Jul. 6, 2022, provisional application No. 63/308,794, filed on Feb. 10, 2022.

(51) Int. Cl.
*E21B 49/08* (2006.01)
*C09K 8/00* (2006.01)

(52) U.S. Cl.
CPC .............. *E21B 49/084* (2013.01); *C09K 8/00* (2013.01); *E21B 49/0875* (2020.05)

(58) Field of Classification Search
CPC .. E21B 49/084; E21B 49/0875; E21B 49/086; E21B 47/11; E21B 47/00; E21B 47/10; E21B 49/00; C09K 8/00
See application file for complete search history.

(56) References Cited

U.S. PATENT DOCUMENTS 7,472,748 B2 1/2009 Gdanski et al.
8,028,562 B2 10/2011 Shah et al.
(Continued)

*Primary Examiner* — Yong-Suk (Philip) Ro
(74) *Attorney, Agent, or Firm* — Greene IP PLLC

(57) ABSTRACT

An apparatus and methods for characterizing and communicating chemical tracer presence in a subterranean formation traversed by a wellbore including collecting fluid from the wellbore at a wellhead, analyzing the fluid for the presence or concentration or both of the tracer using a gas chromatograph connected to a line collecting the fluid from the wellhead, and communicating the gas chromatograph analysis information within 24 hours of analyzing the fluid. In some embodiments, the tracing chemical is a perfluorocarbon. In some embodiments, the collecting fluid is continuous. Some embodiments condition a flow of fluid. Some embodiments control the collecting, analyzing, and communicating using a controller that may include an autonomous system that includes a multiplex valve that controls for multiple inputs. The multiple inputs may include time, wellhead identity, calibration, signals from the gas chromatograph or the controller, or a combination thereof. Some embodiments may also analyze for the concentration of the tracing chemicals. In some embodiments, the gas chromatograph measures the fluid from the wellbore after a conditioning activity. The conditioning activity may include adjusting the fluid composition, fluid gas to liquid ratio, time between analyzing, phase separation, temperature control, pressure control, or a combination thereof. In some embodiments, the gas chromatograph has a line in direct communication with the wellbore. In some embodiments, communicating includes a transmitter to transmit a signal to a remote device.

An apparatus and method for monitoring the presence of a chemical tracer in a fluid produced from a wellbore including continuously collecting and conditioning a sample line from a wellbore, analyzing the sample line with a gas (Continued)

chromatograph at the wellsite, recording information from the analyzing continuously over time; and controlling the collecting, conditioning, analyzing, and recording with a process control device. In some embodiments, the process control device is a microprocessor. Some embodiments communicate information to a remote location. In some embodiments, the collecting, conditioning, analyzing, recording, and communicating occur within 10 minutes or are repeated continuously over 24 hours. Some embodiments may adjust a heater or air conditioner.

17 Claims, 13 Drawing Sheets

(56) References Cited

U.S. PATENT DOCUMENTS

| | | |
|---|---|---|
| 8,332,194 B2 | 12/2012 | Morales et al. |
| 8,636,524 B2 | 1/2014 | Montena et al. |
| 11,327,197 B2 | 5/2022 | Jones et al. |
| 2011/0320128 A1 | 12/2011 | Shook |
| 2014/0260694 A1 | 9/2014 | Szlendak |
| 2015/0130468 A1* | 5/2015 | Christian ................ E21B 47/11 |
| | | 324/324 |
| 2017/0370210 A1* | 12/2017 | Nyhavn ................... E21B 47/11 |
| 2018/0275114 A1 | 9/2018 | Kosynkin et al. |
| 2020/0056471 A1 | 2/2020 | Ellis et al. |
| 2022/0065101 A1 | 3/2022 | Poitzsch et al. |

* cited by examiner

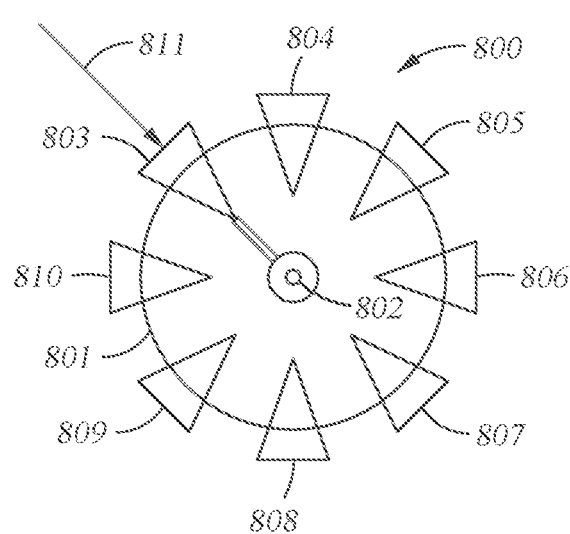
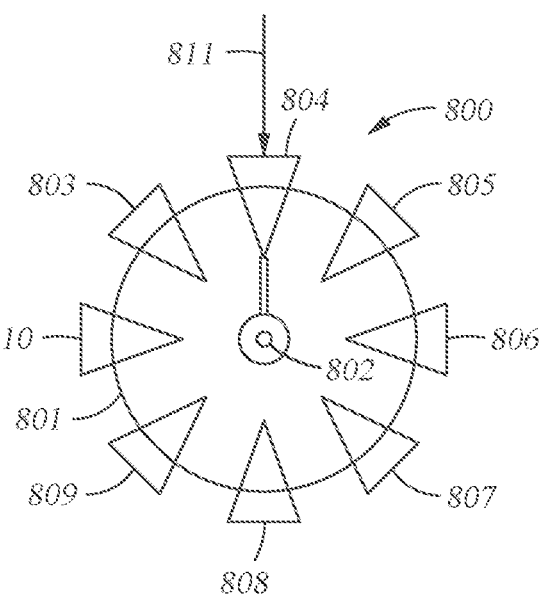
Fig. 8A          Fig. 8B
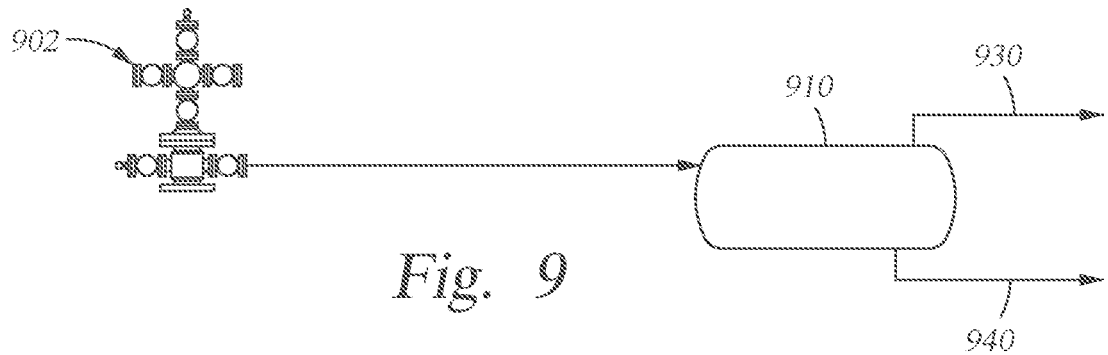
Fig. 9
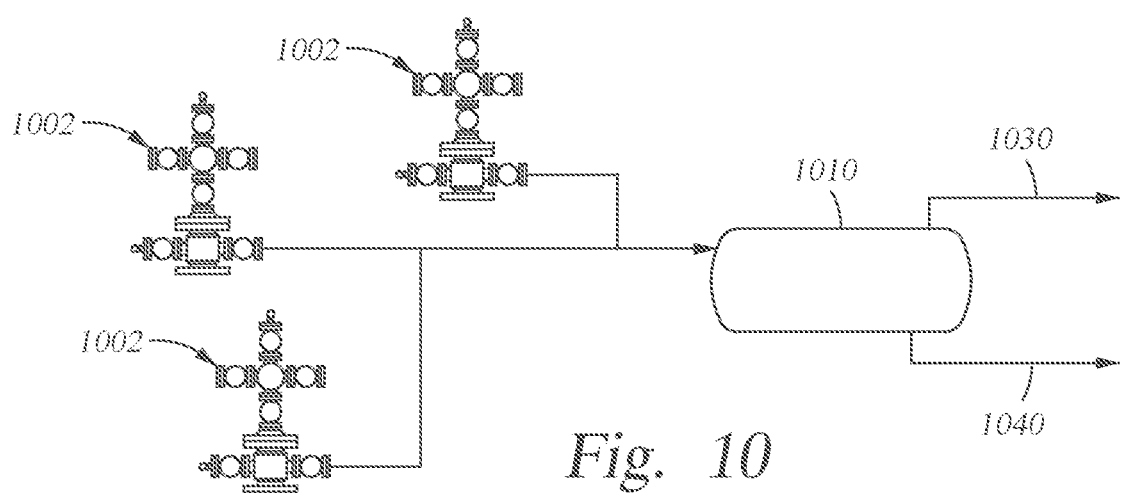
Fig. 10

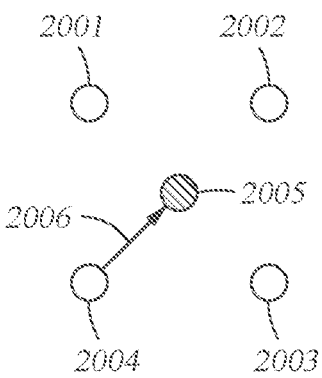
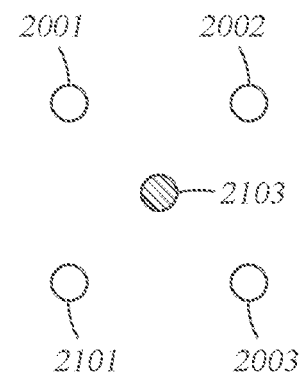
Fig. 20    Fig. 21
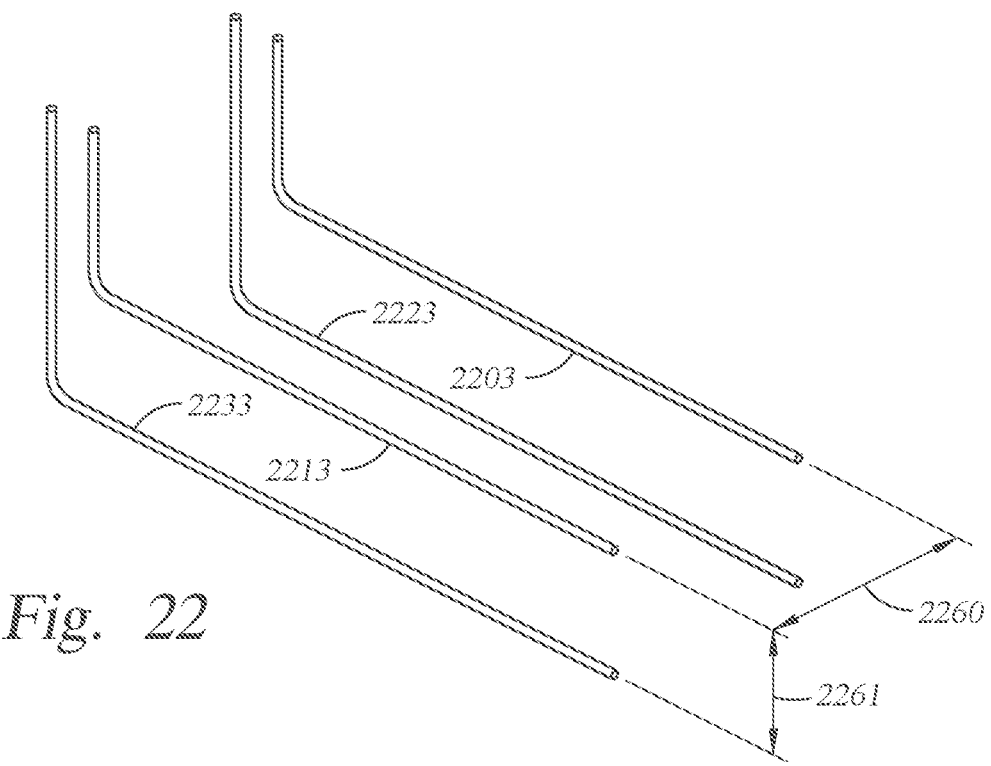
Fig. 22

CONTINUOUS CHARACTERIZATION AND COMMUNICATION OF CHEMICAL TRACER

PRIORITY CLAIM

This application claims priority to U.S. Provisional Patent Application Ser. No. 63/308,794 filed Feb. 10, 2022, entitled Diagnostic System Directly Connected to a Subterranean Formation and U.S. Provisional Patent Application Ser. No. 63/358,541 filed Jul. 6, 2022, entitled Sample Conditioning for a Diagnostic System Directly Connected to a Subterranean Formation. Both applications are incorporated by reference in their entirety.

FIELD

Embodiments of the invention described herein relate to introducing chemical tracers into a subterranean formation and to observing produced fluid to characterize physical properties of the formation using the presence and concentration of the tracers.

BACKGROUND

FIG. 1 (Prior Art) illustrates a way tracers 104 may be present in a subterranean formation 107 traversed by a wellbore 103. Tracers 104 are injected into the reservoir fracture 106 during hydraulic fracture stimulation or secondary recovery injections through wellbore 103 and wellhead 102. Once placed in the reservoir, tracers will remain embedded within the oil, gas, or water as the fluid is produced as shown with flowlines 108. The surface tubing and lines between the surface equipment shown with reference numerals 109, 111, and 114 may be also have sample ports that require human interaction. The material selected for tracers may include RFID tags, radioactive material, DNA, and multiphase materials wherein one bulky chemical is embedded in a carrier solid such as proppant or a small pill. Samples are taken of these produced fluids, put into a box and accumulate until the box is full, shipped via a courier, transported to a lab, logged in, prepped and transferred into smaller chromatography vials, and finally analyzed for the tracers present and the concentration. This process used to take up to sixty days or longer depending on the remoteness of the field location. Someone had to physically catch samples of the produced fluids in a sample container, prepare those samples for shipping, move them to a collection hub, transport them by courier to a lab, receive them at the lab, prep them, analyze the samples and report the data to the client. The process of collection of materials, lab transport, lab analysis, and results report back to the ultimate beneficiary of the information has been in use with no noteworthy decrease in processing time for about half a century. Insights as to the performance and connectedness of the reservoir may be gleaned as fluid samples are often separated in separator 110, collected by hand from the needle valve 112 or from line meter 113, sent to remote locations for processing, and then tested over a process that can take weeks to months. That is, often, the use of tracers to glean properties of the reservoir to inform a reservoir model is routine, slow, and expensive.

Further, gas chromatography is often used to conduct the measurements of tracer material in locations remote from the wellbore 103. Traditional gas chromatography equipment requires a controlled laboratory environment, time for wellbore samples to travel from the wellsite to the laboratory, and a human lab technician to supervise the process and report the test results. Also, while a wellbore is drilled, there is sometimes a large, mobile building to house a gas chromatography device to test the mud and other drilling process fluids in the midst of other lab equipment, computing equipment, and space for a desk for a human. There are often gas chromatography delays for calibration because the device is not in operation continuously. The mobile building, also known as the mud hut, is configured for human presence and human control of the sample and gas chromatograph. The mud hut is further configured to house other testing devices and to control its atmosphere for human comfort. The hut is bulky like any modular, manufactured building requiring special wide load status on public roadways and is removed from the wellsite as soon as drilling the wellbore is complete.

SUMMARY

Embodiments of the invention described herein relate to an apparatus and methods for characterizing and communicating chemical tracer presence in a subterranean formation traversed by a wellbore including collecting fluid from the wellbore at a wellhead, analyzing the fluid for the presence or concentration or both of the tracer using a gas chromatograph connected to a line collecting the fluid from the wellhead, and communicating the gas chromatograph analysis information within 24 hours of analyzing the fluid. In some embodiments, the tracing chemical is a perfluorocarbon. In some embodiments, the collecting fluid is continuous. Some embodiments condition a flow of fluid. Some embodiments control the collecting, analyzing, and communicating using a controller that may include an autonomous system that includes a multiplex valve that controls for multiple inputs. The multiple inputs may include time, wellhead identity, calibration, signals from the gas chromatograph or the controller, or a combination thereof. Some embodiments may also analyze for the concentration of the tracing chemicals. In some embodiments, the gas chromatograph measures the fluid from the wellbore after a conditioning activity. The conditioning activity may include adjusting the fluid composition, fluid gas to liquid ratio, time between analyzing, phase separation, temperature control, pressure control, or a combination thereof. In some embodiments, the gas chromatograph has a line in direct communication with the wellbore. In some embodiments, communicating includes a transmitter to transmit a signal to a remote device.

Embodiments of the invention described herein relate to an apparatus and method for monitoring the presence of a chemical tracer in a fluid produced from a wellbore including continuously collecting and conditioning a sample line from a wellbore, analyzing the sample line with a gas chromatograph at the wellsite, recording information from the analyzing continuously over time; and controlling the collecting, conditioning, analyzing, and recording with a process control device. In some embodiments, the process control device is a microprocessor. Some embodiments communicate information to a remote location. In some embodiments, the collecting, conditioning, analyzing, recording, and communicating occur within 10 minutes or are repeated continuously over 24 hours. Some embodiments may adjust a heater or air conditioner.

FIGURES

FIGS. 8A and 8B are schematic diagrams of embodiments of flow paths in an eight-input multiplexing valve.

FIG. 9 is a schematic diagram of an embodiment of a separator in line with a wellhead and flow lines.

FIG. 10 is a schematic diagram of an embodiment of a separator in line with multiple wellheads and flow lines.

FIG. 20 is a sectional view of a subterranean formation traversed by multiple wellbores.

FIG. 21 is a sectional view of a subterranean formation traversed by multiple wellbores.

FIG. 22 is a sectional view of several wellbores of an embodiment related to case study 1.

DETAILED DESCRIPTION

Figure 1:
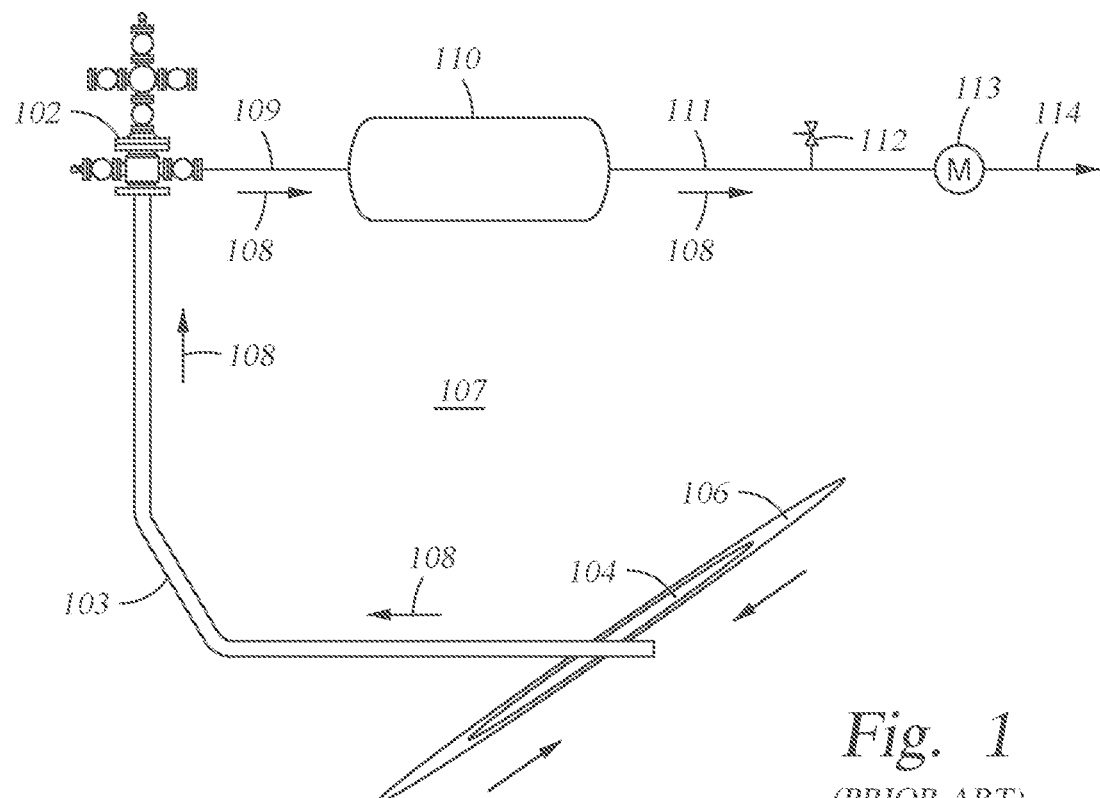
FIG. 1 (Prior Art) is a schematic diagram of a flow path of reservoir fluids and tracers in a subterranean formation traversed by a wellbore at a wellsite.

Embodiments herein relate to collecting chemical composition and concentration information at the wellsite to inform and better manage a producing reservoir with more information and faster communication during well services. Some embodiments may have systems that help a user to characterize well-to-well connections from a collection of wells, identify and confirm the impact of hydraulic fracturing on offset wells, and more efficiently or effectively produce mature fields under secondary recovery. By directly connecting a diagnostic system to the reservoir wellbore, engineers have a faster system to optimize well performance, better understand well-to-well connections from a collection of wells, better understand the impact of hydraulic fracturing on offset wells, and more efficiently produce mature fields under secondary recovery.

The process begins with the injection of chemical tracers into a well or group of wells during hydraulic fracturing operations. Once the well has been completed and prepared for startup, samples of the well fluids are collected and analyzed on a continuous basis. The data is delivered to the ultimate beneficiary within twenty-four hours after a quality control process.

Embodiments herein include individual or a suite of tracers injected into the reservoir. Chemical tracers are soluble in the fluid they are meant to trace, oil, natural gas, and water. Tracer composition is tailored to be non-reactive with reservoir fluids or reservoir rocks, stable at downhole temperatures, and detectable at low concentrations, typically in parts per billion (ppb). Tracer chemical concentrations are proportional to the amount of reservoir fluid produced. Tracer chemicals, also referred to as tracers, may include perfluorocarbons such as perfluoromethylcyclopentane, perfluoromethylcyclohexane, perfluoro-1,2-dimethylcyclohexane, perfluoro-1,3,5-trimethylcyclohexane, perfluoro-n-propylcyclohexane, perfluoro-i-propylcyclohexane, perfluoroethylcyclohexane, perfluoro-2-methyl-3-ethylpentane, perfluoro-2,4-dimethyl-3-ethylpentane, perfluoroperhydroindane, and perfluoro-1,4-dimethylcyclohexane. Tracers may also include 1,3-dibromo-5-fluorobenzene, 2-bromoiodobenzene, 1-fluoro-3-iodobenzene, 1-fluoro-4-iodobenzene, 2,5-(bis)trifluoromethylbromobenzene, 3,4-dibromotoluene, 2-chloro-6-iodotoluene, 5-bromo-2-fluoroiodobenzene, 2-bromo-4-fluoro-1-iodobenzene, 1-bromo-2,3,4-trifluorobenzene, 2-chloroiodobenzene, 3,4-difluoroiodobenzene 3-chloro-4-fluoroiodobenzene, 2,3,4-trifluoroiodobenzene, 3,5-bis(trifluoromethyl)iodobenzene 1,2-dibromobenzene, 3-bromo-4-fluorobenzotrifluoride, 2-fluoro-4-iodotoluene, 2-bromo-1,4-dichlorobenzene, 1-bromo-3-chloro-2-fluorobenzene, 1-bromo-4-chlorobenzene 4-iodotoluene, 1-chloro-4-iodobenzene, 1,4-dibromo-2,5-difluorobenzene, 3,5-dibromotoluene, or a combination thereof. Tracers may also include Sodium 2-fluorobenzoate solution, sodium 3-fluorobenzoate, sodium 2-(trifluoromethyl)benzoate, sodium 3-(trifluoromethyl)benzoate solution, sodium 2-chloro-6-fluorobenzoate, sodium 2,3,4,5 tetrafluorobenzoate, or a combination thereof. A series or mixture of any of these chemicals may be appropriate over the lifetime of a tracing effort such as multiple stages in one wellbore or multiple wellbores with individual or multiple stages of well services activity.

The tracers can be oil, water, or gas soluble and pumped throughout a hydraulic fracturing treatment in single stages or combined stages or injected with injection fluids in secondary recovery operations. The tracers can be injected with a hydraulic fracturing treatment or with injection fluids into injector wells, such as in a water flood or miscible gas flood. As the well is produced, the tracers will flow out of the reservoir with the reservoir fluids and into the wellbore, up the wellbore to the earth's surface, through the wellhead, into the separator, then into the flowline that connects to the sales line or stock tank. FIG. 1 (prior art) illustrates the flowlines 109, the flow pathway of a hydraulically fractured horizontal wellbore 105 with tracer.

Wellsite is a term used for the temporary or permanent intersection of the wellbore with the surface of the earth at a wellhead and its surrounding land surface. A wellhead may include a variety of valve configurations depending on the wellbore properties, the production of the wellbore, the equipment to be used to modify the wellbore or its surrounding formation, and how the collection of reservoir fluids is controlled. The wellsite, informally referred to as a pad, is configured for temporary or permanent surface equipment, parking, trailers for offices, operator rest, or lab huts, storage for totes, barrels, silos, or shipping containers, waste treatment and storage equipment, pump trucks, missiles, agitation tanks, cement mixers, or other equipment, storage, human workplace accommodations, etc. Wellsite locations typically measure 350 feet by 350 feet and can contain up to 20 wells. Sometimes those wells at the earth's surface are spaced 10 feet apart and their flowlines 10 feet apart or less.

Below the earth's surface these groups of wells are traversing thousands of feet from point to point and thousands of feet vertically. Generally, a well is drilled into the formation of interest, five thousand to ten thousand feet below the earth's surface then turned horizontally and drilled seven to fifteen thousand feet horizontally. Lateral spacing between each horizontal wellbore is typically six hundred to two thousand feet apart. These 4.5 inch diameter steel wellbores act as plumbing to efficiently drain oil and gas from the reservoir. It is the job of the operating company to place these wellbores so that the least amount of wells recover the maximum amount of reservoir as possible. To arrive at the optimum well density several engineering studies are utilized including reservoir communication and well-to-well communication. Directionally drilling these wells allows the operating company to minimize the amount of space required on the surface of the earth while maximizing the amount of reservoir contact far below the earth's surface.

Sampling the fluid from the wellbores traversing the formation can help optimize the plan for managing recovery from the formation. The time of collecting and communicating reliable information from this sampling influences the effectiveness of the plan. Historically, reservoir managers relied an old and antiquated system where a human must open a valve to physically deposit a sample into a container, place that container in a box, label the container, assemble a full box of samples, ship that box to a courier, receive the samples at a lab, log in the samples, transfer the samples into lab sample-vails, label the lab vials and finally analyze the samples. The life of a sample in some embodiments described herein is short in both time and distance. Seconds earlier the sample originated from within the reservoir, flowed up the wellbore through the flowline and into the instrument. The sample did not interact with air or outside constituents and was not handled by a human.

Collecting fluid from the wellbore at a wellhead may include fluid in transit from the wellbore flowing directly though the wellhead and into rigid stainless steel line, flexible tubing, stainless steel rigid tubing, or any other ongoing, continuous, enclosed flow of fluid. Connections, welding, flanges, separation tools, pressure regulators, valves or other devices may slow, but do not stop the flow of fluid for collecting. The fluid collection in most embodiments is not encumbered by human delay for physical sample collection, shut in for long term production delays, etc.

Figure 2:
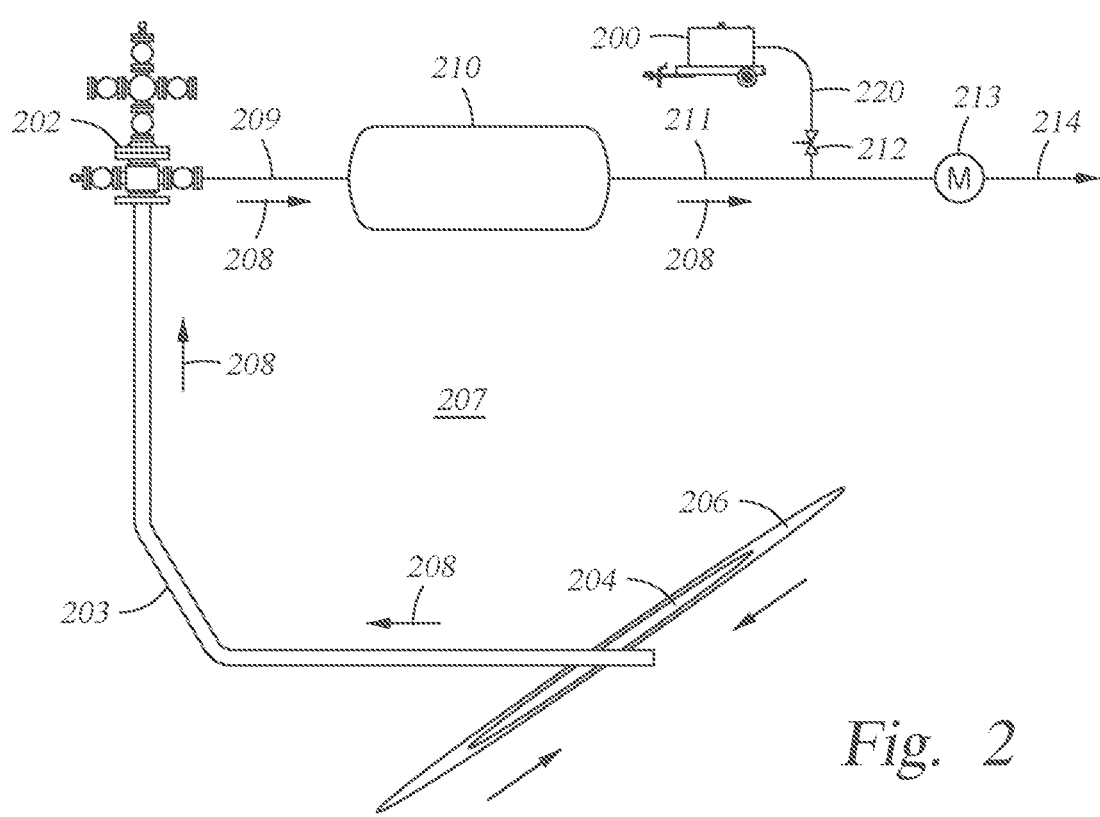
FIG. 2 is a schematic diagram of a flow path of reservoir fluids and tracers in a subterranean formation traversed by a wellbore at a wellsite with an embodiment of an instrument in communication with a needle valve.

FIG. 2 illustrates an embodiment with an instrument 200 in fluid communication with a needle valve 212. That is, FIG. 2 shows tracer 204 introduced into formation 207 traversed by a formation fracture 206 with a wellbore 203. Before the fluid from the reservoir 206 flows to the instrument 200 it travels through wellbore 203, a wellhead 202, a separator 210, and may continue through line meter 213. Flow lines 208 illustrate this flow. In some embodiments, the instrument 200 is the size of a carry-on suitcase with approximate dimensions of 22"×15"×10". Internal components include a gas-chromatograph, with a packed or capillary column; an oven; insulation; a detector; either flame-ionization, mass spectrometer, electron capture, or ion-mobility spectrometer; a multiplexing valve; a computer; over-the-air communications electronics; and connection ports. All these components are assembled within the case. The instrument 200 will also include carrier gas, either nitrogen or helium, calibration gases, and blank gases. In some embodiments, the gas-chromatograph and its components are manufactured by and are commercially available from Agilent of Santa Clara, California, Thermo Fisher Scientific of Waltham, Massachusetts, G.A.S of Dortmund, Germany, VICI of Schenkon, Switzerland, or PID Analyzers of Sandwich, MA FIG. 2 shows the instrument 200 connected to the system via the needle valve 212 and tubing 220. Some embodiments may have slight variations in how the instrument 200 is engaged with the surface tubing and lines between the surface equipment shown with reference numerals 209, 211, and 214.

Figure 3:
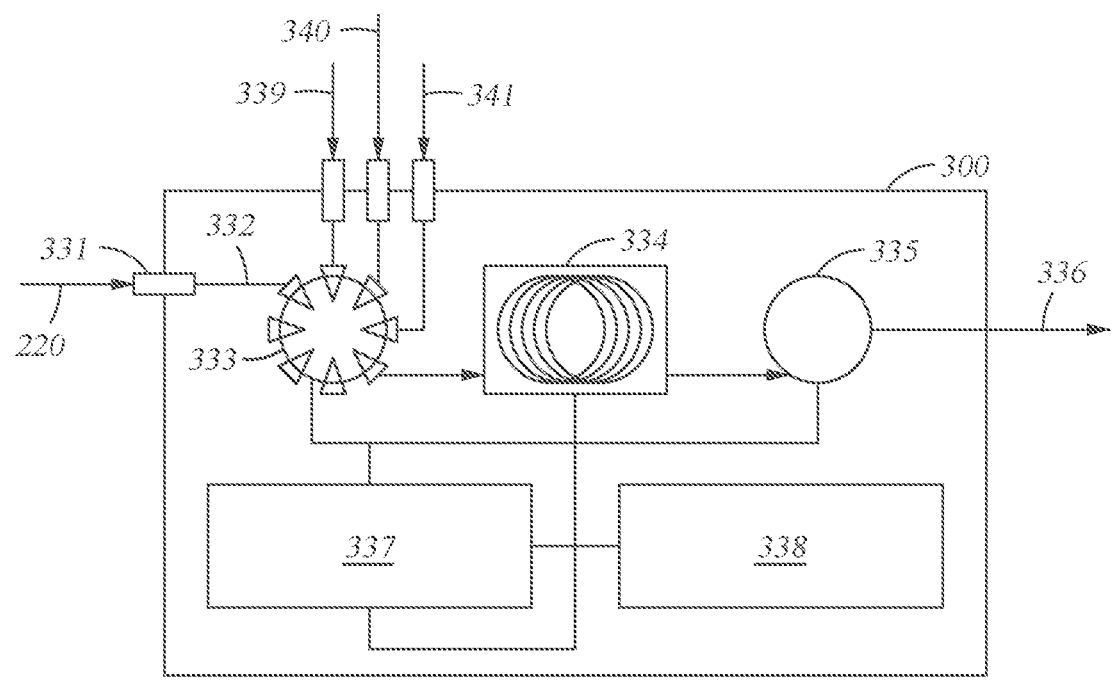
FIG. 3 is a schematic diagram of components within an embodiment of an instrument.

A case sectional view 300 is shown in FIG. 3. As the fluid and tracer flow through the flowline 332 some fluid will pass through the line 220 from needle valve 212 and enter the instrument at connection 331. Calibration gas 339, blank gas 340, and carrier gas 341 will also enter the case. Fluid will pass through the multiplexing value 333, into the gas-chromatograph 334 where the tracer molecules will be separated then into the detector 335 where the tracer molecules will be quantified. After passing through the detector 335, the fluids will be collected via a vent line 336. The case 300 includes a computer or controller or process control device 337 and communications electronics 338.

Figure 4:
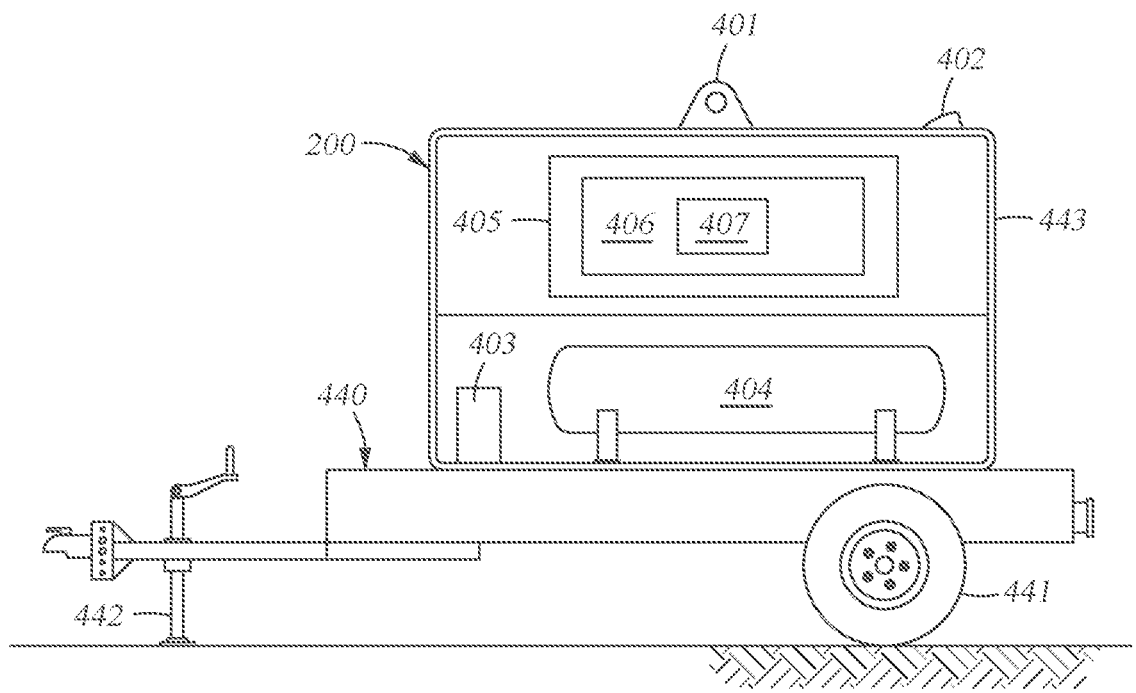
FIG. 4 is a schematic diagram of an embodiment of a utility trailer that includes an embodiment of an instrument with some components.
Figure 5:
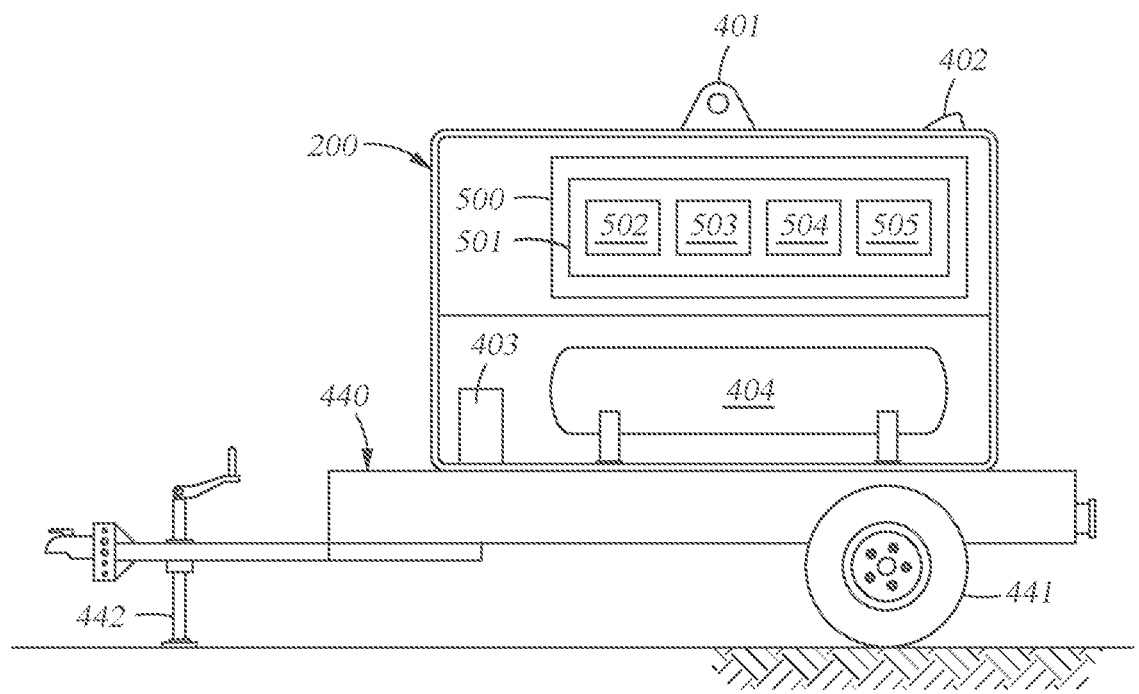
FIG. 5 is a schematic diagram of an embodiment of a utility trailer that includes an embodiment of an instrument with some components.

The physical system is illustrated in FIGS. 4 and 5 which show sectional views of an embodiment of a small trailer 440 that is configured for placement close to the production lines of the well, often directly in line with the wellhead 202. A mounting skid 443 houses the calibration gas 403 and carrier gas 404, and enclosure 405 protects the system from harsh weather. The enclosure 405 may enclose a heater or air conditioner (not shown). In some embodiments, the skid 443 and enclosure 405 house the electric equipment 406, maintain temperature control 407, and protects the electronics 406 from harsh weather. Also, the skid and enclosure 500 may include a computer (not shown in FIG. 4 or 5), gas chromatograph 501 with a detector, working gases 403, 404, gas purifiers (not shown in FIG. 4 or 5), a multi position valve (not shown in FIG. 4 or 5), a cellular antenna 402 and router 502, and an uninterrupted power supply 504, sample lines and sample inlet 505 to connect the production lines of a well to the gas chromatograph 503, and sample conditioning equipment (not shown in FIGS. 4 and 5). A lifting hook 401, wheels 441, and jack 442 help with transport of the trailer 440.

The utility trailer 440 is about five feet wide by about ten feet long and weights about one thousand pounds. Sitting on top of the trailer 440 is the mounting skid 443, it is about five feet long, about three feet wide, and about four feet tall. It weighs about one thousand pounds. The mounting skid 443 is designed and manufactured to handle the harsh and rugged conditions of the field. Inside the bottom compartment of the mounting skid is a compressed cylinder of carrier gas 404 weighting about seventy five pounds and is about five feet long and about thirty inches in diameter. A small bottle of calibration gas 403 is about fifteen inches high, about four inches in diameter and weights about two pounds. On the top compartment of the mounting skid 443 sits the enclosure 405. The enclosure is about forty inches long, about thirty inches wide and about twenty inches tall and weighs about fifty pounds. The enclosure is ruggedized with high-strength powder-coated aluminum. It is designed to keep dust, wind, dirt, rain, ice and snow from contacting or affecting the electronics housed inside. Mounted to the side of the enclosure 405 is the temperature control unit 407 which is about fifteen inches high, about ten inches wide and about ten inches deep, the unit weighs about thirty pounds. The temperature control unit is designed to function in ambient temperatures of −40° C. to 40° C. and is designed to prevent dust, wind, dirt, rain, ice and snow from entering the enclosure while conditioning the air inside the enclosure to a set temperature. Sitting on top of the mounting skid 443 is a lifting eye 401, about four inches in diameter and a cellular antenna 402 which is about four inches in diameter and about three inches high and weights about two pounds. The cellular antenna is made of military grade rugged polymers and designed to function in harsh field conditions.

Inside the enclosure 405 is the gas chromatograph 503, about twenty four inches long, about nineteen inches wide and about eight inches high weighing about twenty pounds. The gas chromatograph is ruggedized with industrial grade electronics to withstand high temperatures and the stresses of field locations and movement from field location to field location. An uninterruptable power supply 504 has dimensions of about nineteen inches wide, about four inches high and about twelve inches long and weighs about twenty pounds. The uninterruptable power supply is constructed from industrial grade electronics and military grade materials. These units are designed to function in extremely harsh field locations such as war theaters. A cellular router 502 has dimensions of about four inches long, about three inches wide and about two inches tall weighing about one pound. The cellular router is also made of industrial grade and rugged materials and is designed to function in large changes in ambient temperatures in harsh field conditions. On the outside of the enclosure are the inlets 505 for the production lines to the wells, each inlet 505 is about one sixteenth of an inch in diameter.

Figure 6:
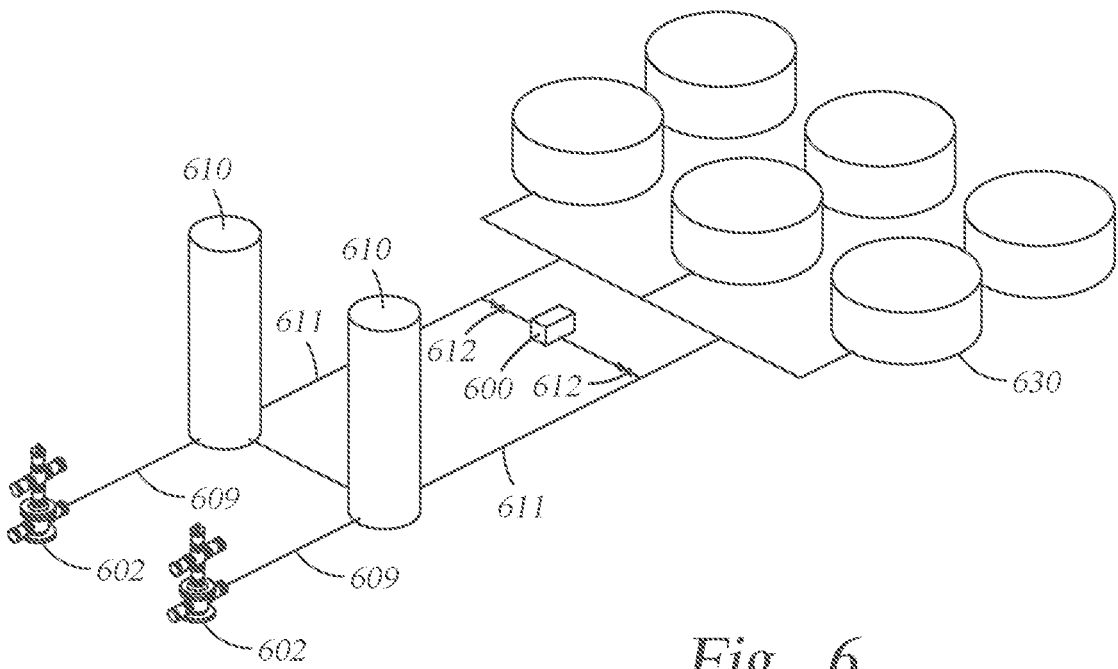
FIG. 6 is a dimensional view of a wellsite including embodiments of wellheads, separators, an instrument, and tank battery.

FIG. 6 is a three dimensional wellsite view that includes two wellheads 602, two separators 610, one instrument 600, and several tanks 630. The instrument 600 will be connected to the wellheads 602 where the tracers are expected to be produced via tubing 609. The instrument 600 will be placed downstream of the separator 610 near the metering equipment (not shown in FIG. 6), and next to the flow lines 611. FIG. 6 illustrates the relative size and location of the instrument 600 compared to the flow lines 609 and metering equipment 612.

Figure 7:
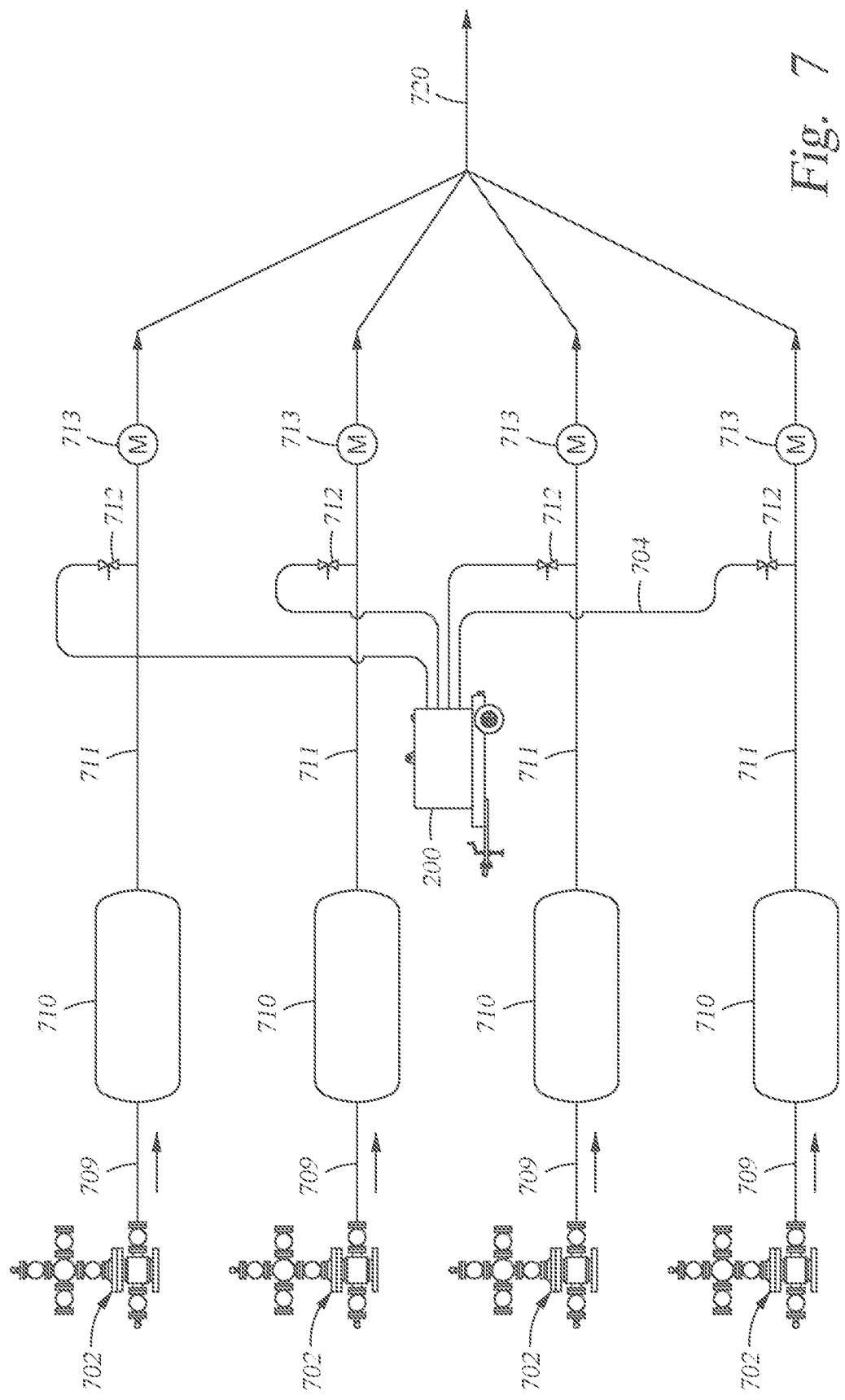
FIG. 7 is a schematic diagram of an embodiment of multiple wellheads, multiple separators, an instrument, and other components.

FIG. 7 illustrates the location of the instrument 200 at a wellsite with four wellheads 702. Each wellbore to be sampled is entered into a computer in instrument 200 or remotely in communication with instrument 200 by its name and position in the sequence. For example, well 1—sequence $1^{st}$, well 2—sequence $2^{nd}$, well 3—sequence $3^{rd}$, well 4—sequence $4^{th}$, calibration gas—sequence $5^{th}$, blank gas—sequence $6^{th}$. Once the sequence is entered a multi position valve housed in or nearby the instrument 200 is activated for each well. The flow rate from the wellhead 702 to the gas chromatograph in the instrument 200 is verified and set.

If a group of wells and wellheads 702 are positioned too far apart, typically greater than 100', a second instrument (not shown) similar to instrument 200 can be used. Each wellhead 702 will be connected to the instrument 200 with 1/16 inch or 1/4 inch stainless steel tubing 704 connected to the needle valve 712 on the flowline 711 from the separator 710. There may also be lines 709 to separators 710 before the fluid flows to the instrument 200 Some embodiments will bury the tubing 704 just below the ground or place a barrier over it to prevent tripping hazards. The tubing connections 704 connect into the multiplexing valve (not shown in FIG. 7) in the instrument 200. The calibration gases and blank gases will also connect into the multiplexing valve in or near the instrument 200. Power for the instrument will come from existing electricity sources at the field location, a battery pack, or a battery pack with solar charging capability. The power options will be determined by the field location and what is most accessible.

The multiplexing valve in instrument 200 allows for multiple inputs and one output. By closing off all the inputs but one then cycling to the next input, multiple flow streams can be sampled with one instrument. FIG. 7 also shows line meters 713, and line 720 to the main sales line or stock tank.

FIGS. 8A and 8B show the flow paths of an eight-input multiplexing valve 801. FIG. 8A shows the inlet fluids 811 are coming into input 803 and exiting through the output 802 at the center of the valve. Inputs 804, 805, 806, 807, 808, 809, and 810 remain closed to flow. FIG. 8B shows the valve 801 has switched to connect inlet fluids 811 to input 804 while closing inputs 803, 805, 806, 807, 808, 809, and 810.

The operator will set the instrument to begin running on a schedule; this can be done by directly connecting to the instrument or remotely connecting to the instrument. The instrument and its communication electronics are accessed from anywhere in the world via cell or satellite signal. Once sampling is initiated the multiplexing valve will open and allow 1 microliter of fluid into the system. This will be joined by 10 microliters of carrier gas. The sample will then travel with the carrier gas into the gas chromatograph, then into the detector and finally deposited into a collection chamber or vented to the atmosphere. The system computer will record the data from the run and convert the raw data into time, date and concentrations present of each tracer, if there are tracers present in the sample. This sample analysis takes less than thirty minutes. In some embodiments, the duration of less than about 30 minutes is needed to analyze the fluid coming off the wellbore, i.e. natural gas coming into the instrument with tracers in it. For example, if there are 8 tracers in that gas all 8 tracers will be separated by the gas chromatograph and each one will pass through the detector.

The data will then be encrypted and sent to the data collection platform via cell signal and the communication electronics. This means that tracers coming out of the reservoir minutes earlier are run through the instrument, analyzed, quantified, and delivered to the client in near real time. In addition, this can be done with multiple wells producing tracers by simply rotating the multiplexing valve. The multiplexing valve will rotate to allow fluids from the next well in the collection and the cycle will repeat. This is all done automatically according to a schedule set by the instrument operator and can be done from anywhere in the world. The instrument operator connects to the instrument like any networked computer, logs into operating system, opens the instrument control software and sets the run schedule. This consists of what positions the multiplexing valve will take and when, when a run will start and when the instrument is finished for the day. The system analyzes reservoir fluids in real time, essentially connected to the reservoir, and the schedule is modified by simply remote connecting into the instrument.

Further, in some embodiments, there are multiple fluids separated at a separator. For a gas well there may be water and gas, approximately, often 2 lines. For an oil well there may be water, oil, and gas, often 3 lines.

Next, we consider how the sample is conditioned. That is, embodiments herein relate to sample conditioning for collecting chemical composition and concentration information at the wellsite that informs how to manage a producing reservoir.

Practically speaking, water and oil expand when vaporized into gases in a gas chromatograph and can saturate the system causing it to malfunction. To separate the analytes of interest in a gas chromatograph they are heated to temperatures as high at 400° C. Even a tiny drop of liquid, such as 0.1 microliter, greatly expands as it evaporates into the gas phase in a gas chromatograph. Larger amounts of liquids expanding into the gas phase cause wear and tear on critical parts of the system. Some embodiments condition sample fluids before they enter the diagnostic system to ensure the accuracy and longevity of the equipment.

FIG. 9 illustrates an embodiment of an individual separation system and FIG. 10 illustrates an embodiment of a bulk separation. Production facilities of the embodiments described herein are designed in several configurations and may depend on the nature of the produced hydrocarbons, the rates at which the hydrocarbons are produced over time, and the operating philosophy of the well operator. FIG. 9 shows how some configurations take flow directly from the wellhead 901 to separator 902 to separate all produced fluids into separate streams for each well on the wellsite before hydrocarbons enter the sales line 903, that is, the line that includes recoverable, marketable hydrocarbon containing material and other material line 904. As the oil and/or gas, and water comes out of the reservoir at the wellhead these fluids are piped, in a four inch line, to the separator, usually 150 feet away to the production facility. The three-phase fluid enters a separator which is a large cylindrical tank laid on its side. Its dimensions range from 3' in diameter and 6' long sitting 3' off the ground. Coming out of the separator are three lines each 4" in diameter. One for gas which travels several feet to the 12" sales line, one for oil which travels another 20-30' to the oil stock tanks, typically steel or fiberglass and 40' tall and 10' in diameter, and one for water which travels a similar distance to the water tanks, also made of steel or fiberglass and 40' tall and 10' in diameter. Other configurations as illustrated by FIG. 10 combine several well streams together after they leave the wellheads 1001 and separate the fluids using larger combined separation equipment such as separator 1002. This is known as bulk separation. The three-phase fluids for multiple wells are piped in four inch lines the same 150' away to the wellsite production facility to a larger bulk separator, 5' in diameter and 6' long sitting 3' off the ground. The combined separated streams of oil, water, and gas from multiple wells travel to the 12" gas sales line 1003, and the line 1004 to 40' oil stock and water tanks. In gas wells the combined fluids are two-phase and include gas and water. In the case of bulk separation, sample conditioning may be needed to isolate the produced gas or oil that is being fed into the diagnostic system as the sample stream.

To accurately diagnose a well's performance and make changes to the well's operating conditions in real time, an individual sample of the oil or gas must be taken from each well. Comingled samples containing fluids from multiple wells do not provide sufficient information to optimize the reservoir flowing conditions. These individual samples will be before the bulk separation equipment and will need to be conditioned, i.e. the water or oil removed, before it is piped to the diagnostic system via $\frac{1}{16}$" stainless steel lines.

The fluid properties of the hydrocarbons in the sales line or in the lines connected into the individual separator or bulk separator may also benefit from sample conditioning in some embodiments. Changing temperatures and pressures may cause components of natural gas to condense into liquids. Some embodiments benefit from conditioning these fluids to ensure the accuracy of the results and life of the diagnostic system. Since the system cannot handle liquid drops larger than 0.1 microliter, these natural gas liquids that may condense and degrade the system must be removed.

Sample conditioning equipment for some embodiments may be purchased from K2 Controls in Houston, Texas, Welker Inc. in Sugar Land, Texas or any other measurement and analysis company serving the pipeline, production, or distribution industries. In some embodiments, this equipment includes a 14"×6"×6" stainless-steel enclosure, $\frac{1}{16}$" tubing, pressure ring, heater, 12" long probe, engineered membrane material, and/or 2'×2' water knockout. Some embodiments may include an air conditioner.

Some embodiments feature a direct connection to a diagnostic system that is sealed and tailored to include an appropriate pressure drop to ensure sample delivery to the diagnostic system. In a dry gas well where mainly methane is present the gas from the 4" line is piped through a ¼" NPT, 4" long sample port through a pressure regulator then into $\frac{1}{16}$" stainless steel tubing 5-30' to the diagnostic system. The 4" sales line is typically elevated off the ground by 4' and has several ¾" NPT sample ports, typically used for metering equipment. The diagnostic system requires low pressure sample gas and the pressure regulator drops the gas pressure from 150 psi to 15 psi.

Some embodiments feature a probe with an engineered membrane and a pressure regulator to ensure sample delivery to the diagnostic system. In a gas well where bulk separation is being used the engineered membrane will prevent water from entering the sample stream. The 12" long probe with a 2" engineered membrane tip is inserted in the fluid stream via a ¾" NPT, 4" long sample port. A pressure regulator is attached to the top of the probe and then connected to $\frac{1}{16}$" stainless steel tubing run 5'-30' to the diagnostic system. This configuration blocks any liquids in the flow stream and allows sample gas to flow to the diagnostic system.

Some embodiments feature a probe with an engineered membrane, a heated enclosure, and a pressure regulator to ensure sample delivery to the diagnostic system. In a gas well where bulk separation is being used the engineered membrane will prevent water from entering the sample stream. The heated enclosure with dimensions of 14"×6"×6" encases a 12" long probe with a 2" special membrane tip probe and a pressure regulator. The enclosure heats the gas to prevent heavier gas components from condensing in the sample stream. The heater temperature will be specific to the gas properties and chosen from the gas's phase diagram. The probe is inserted in the fluid stream via a ¾" NPT, 4" long sample port. A pressure regulator is attached to the top of the probe and then connected to 1/16" stainless steel tubing run 5'-30' to the diagnostic system. This configuration blocks any liquids in the flow stream and allows gas to flow to the diagnostic system.

Some embodiments feature a water knockout system to ensure oil delivery to the diagnostic system. In oil wells where bulk separation is used a 2'×2' water knockout system is connected to the 4" flowline from the wellhead before the bulk separator. The water knockout acts as a mini separator allowing small volumes of oil to flow off the top. As the oil and water flow into the knockout the fluid slows down and allows the water to fall to the bottom of the water. The oil sitting on top of the water spills over the top and into ⅛" stainless-steel tubing that is connected to a 4" long, 3" in diameter stainless-steel vaporizing regulator that heats the oil and vaporizes the light components into a gas. The outlet of the regular is connected with 1/16" stainless-steel tubing and feeds the outlet vaporized gas into the diagnostic system.

Each of the hydrocarbon-based fluids can be described and characterized by their heat content measured in BTUs. Sampling conditioning will be determined by the fluid's heat content and dictate which conditioning system to use. Heat content depends on the carbon content present is the fluid. For example, low BTU gas or "dry" gas is comprised primarily of methane, C1. Mid to high BTU gas contains higher percentages of ethane, C2, and propane, C3, as well as iso-butane, n-butane and iso-pentane (iC4, nC4, iC5). Oil contains higher C content than C5, including hexanes (C6), heptanes (C7), octanes (C8), and all the way up to C30+.

Figure 11:
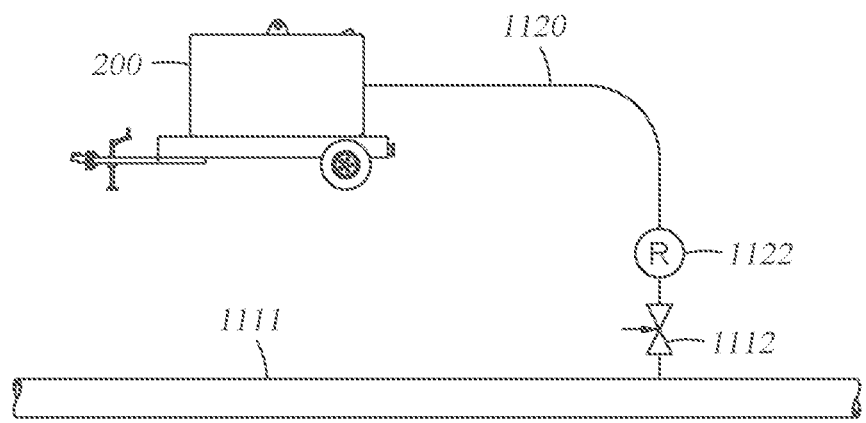
FIG. 11 is a schematic diagram of an embodiment of a gas flow line in communication with a diagnostic system.
Figure 12:
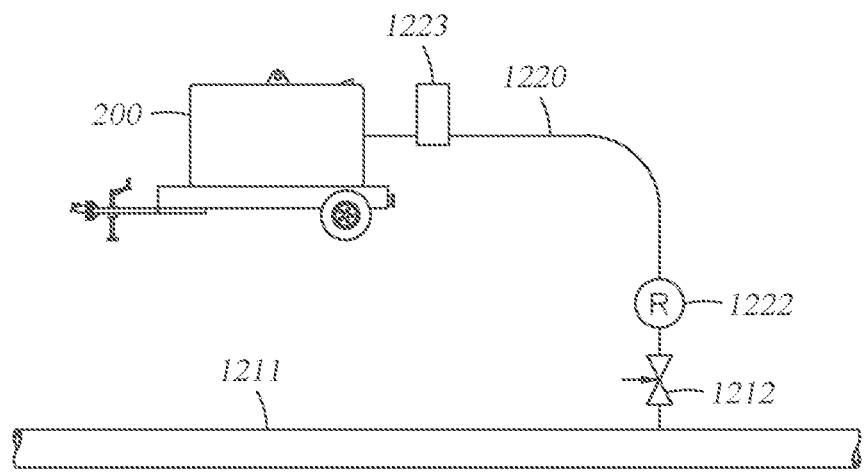
FIG. 12 is a schematic diagram of an embodiment of a gas flow line in communication with a diagnostic system.

Sample conditioning can be categorized into four categories when an individual separator is used:
 Low btu gas on an individual separator
 Mid to high btu gas on an individual separator
 Low btu gas or oil on an individual separator
 Mid to high btu gas or oil on an individual separator Sample conditioning can be categorized into four categories when a bulk separator is used:
 2-phase low btu gas and water on a bulk separator
 2-phase mid to high btu gas and water on a bulk separator
 3-phase low btu gas, water, and oil on a bulk separator
 3-phase mid to high btu gas, water, and oil on a bulk separator A low btu gas on an individual separator case does not require conditioning since the gas is low btu and lacks components that condense during changes in pressure and temperature. The individual separator removes the water from the gas stream. The gas in this case is taken directly into the diagnostic system. A schematic for this embodiment is shown in FIG. 11, it is configured for a low btu gas and has no sample conditioning. FIG. 11 shows a gas flow line 1111, a valve 1112, a pressure regulator 1122, tubing 1120, and an instrument or diagnostic system 200. Mid to high btu gas flowing through an individual separator may require conditioning as the heavier components in the gas, such as propane, could condense when the pressure drops from the flow line to the diagnostic system. To maintain the gas phase a heated enclosure is needed as well as a membrane to ensure liquid droplets do not enter the diagnostic system. A schematic for this embodiment in shown in FIG. 12. FIG. 12 includes flowline 1211 with a pressure regulator 1222, a membrane and optional heater or heated enclosure 1223, stainless steel tubing 1220, and diagnostic system 200.

A low btu gas or oil on an individual separator system case does not require conditioning. If oil is the analysis fluid it can be connected directly to the vaporizing regulator then into the diagnostic system, if gas is the analysis fluid it is directly connected to the system as shown in FIG. 11.

A medium to high btu gas or oil on an individual separator system is like the other mid to high btu gas case, if the oil is the analysis fluid no conditioning is required. If gas is the analysis fluid a heated enclosure and membrane will be needed to maintain the gas phase, as illustrated in FIG. 12.

Figure 13:
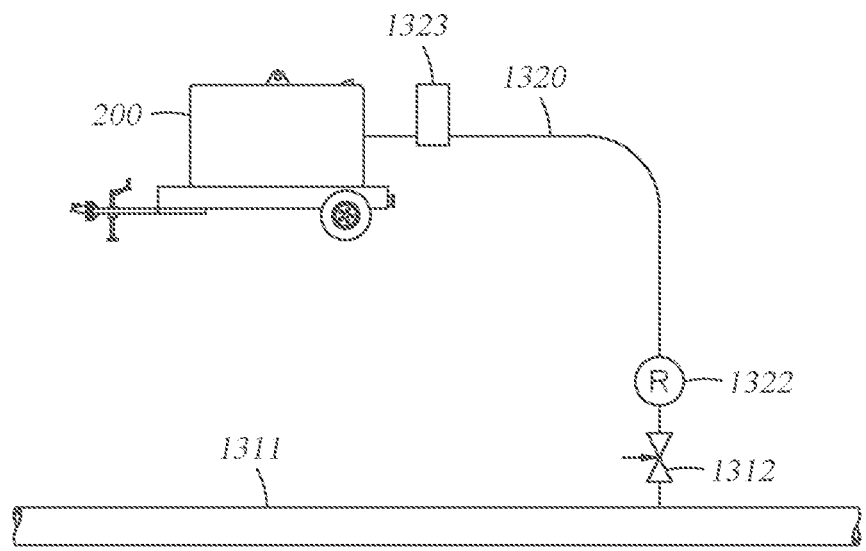
FIG. 13 is a schematic diagram of an embodiment of a gas flow line in communication with a diagnostic system.

A 2-phase low btu gas and water on a bulk separator system requires conditioning to separate the water and low btu gas upstream of the bulk separator. A probe is used to allow the gas to flow into the sample line while a membrane prevents any water from entering the diagnostic system. An embodiment of this is illustrated in FIG. 13. FIG. 13 shows a flowline 1311 with a pressure regulator 1322, probe and engineered membrane 1323, tubing 1320, and diagnostic system 200.

Figure 14:
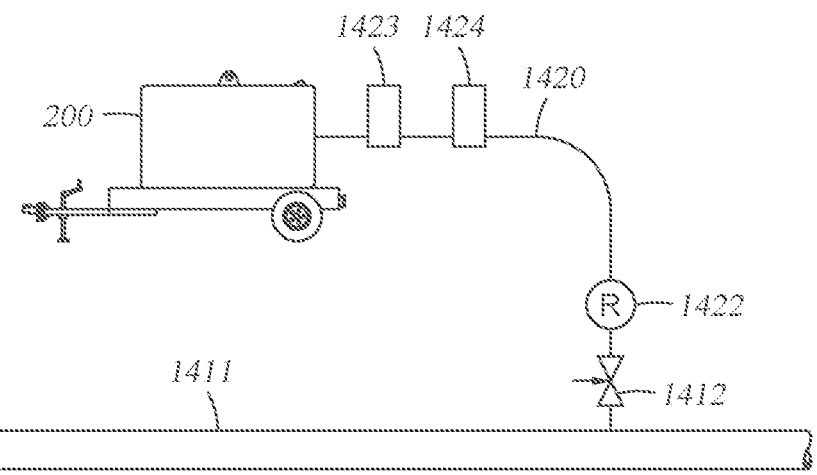
FIG. 14 is a schematic diagram of an embodiment of a gas flow line in communication with a diagnostic system.

A 2-phase mid to high btu gas and water on a bulk separator system may require a probe, heated enclosure, and membrane. That is, in addition to the probe and membrane needed to prevent water from entering the sample stream in the previous case, a heated enclosure is needed to maintain the gas phase preventing heavier gas components from becoming liquids. A sample probe, membrane, and heated enclosure setup is shown in FIG. 14. FIG. 14 includes flow line 1411 with a pressure regulator 1422, engineered membrane 1423, heated enclosure 1424 (these may be in the order shown in FIG. 14 or reversed in which one is in communication with the tubing 1420 first or housed in the instrument 200), tubing 1420, and diagnostic system 200.

Figure 15:
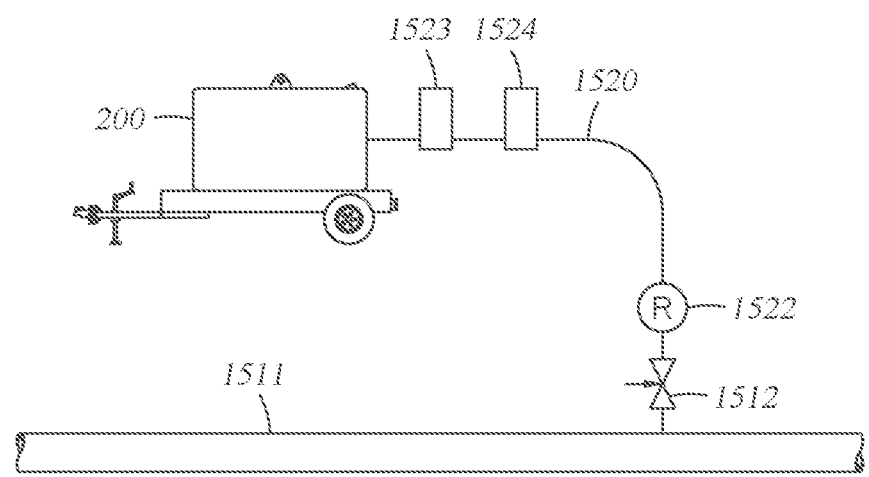
FIG. 15 is a schematic diagram of an embodiment of a gas flow line in communication with a diagnostic system.

A 3-phase low btu gas, water, and oil on a bulk separator system may include a hydrophobic probe and a membrane for oil. If gas is the analysis fluid, a sample probe with a membrane is needed to allow the gas to pass through and prevent the oil and water from entering the diagnostic system. This is illustrated in FIG. 13. If oil is the analysis fluid 2'×2' water knockout is needed to allow the oil the pass through but prevent the water and gas from entering the diagnostic system. This conditioning setup is shown in FIG. 15. FIG. 15 includes flow line 1511, sample probe 1502, water knockout 1524, vaporizing regulator 1523, tubing 1520, and diagnostic system 200. The water knockout 1524 and vaporizing regulator 1523 may be reversed in the order that they engage with tubing 1520 and may be enclosed in the instrument 200 in some embodiments.

Finally, a 3-phase mid to high btu gas, water, and oil on a bulk separator system may include the components as illustrated by FIG. 14 or 15. If gas is the analysis fluid a heated enclosure and membrane is needed to maintain the gas phase and prevent water and oil from entering the system as shown in FIG. 14. If oil is the analysis fluid a hydrophobic probe and membrane will be needed as shown in FIG. 15.

In some embodiments, the system is controlled by a controller or computer. It executes three major processes: operation of the instrument, quantification of the tracers and transmission of the data. The computer tells the multiplexing valve when to open and rotate, and when to activate the gas chromatograph, oven, and detector. It quantifies the raw data from the gas chromatograph and detector into time, date and concentration of the tracer. It then prepares the data to be sent over-the-air via the communications system. The communications systems takes the data in packets, encrypts them and transmits them via cell signal to a receiving computer or computer network.

The last part of the diagnostic system is the data delivery platform which consists of time, date, and concentration outputs of the tracers from the instrument as well as well diagrams, field diagrams, formation diagrams, flowback schedules, production data, pressure data, and flowback data. The system together enables engineers to make decisions and changes to their operations in real time and validates whether their changes are effective.

Embodiments of the system have a methodical workflow with process steps that may be executed in the following order or with some variation. The system is mobilized to the wellsite and often placed as close as possible to the production lines as initial production begins. Samples lines are connected to each well and connected to the enclosure. Sample conditioning equipment is installed on the production lines. The system is plugged into a power source, either line power, a generator, or a bank of solar panels. The computer and gas chromatograph are turned on. The working gases, carrier, and calibration gas are set to their specified pressure and opened. The gas chromatograph is heated up to its specified temperature. The temperature control system is turned on. Communication to the system is tested with a cell phone or laptop connection.

Once the system has reached steady state, its temperature and working gases at their correct temperature, pressures and flow rates, a series of calibration runs are performed. Once the system is repeatability measuring its calibration gases, typically within 30 minutes of startup, it is time to program the system for sampling.

After the sequence is checked and flow rates are verified, it is time to begin sampling and analysis. The sequence is activated by flowing the production fluids into the gas chromatograph. The system will then activate the gas chromatograph sample loop and place the production fluid onto the column. As the sample flows through the column and into the detector the electronics and calibration stored in the computer will characterize the sample by chemical tracer and concentration. The multi position valve will then switch to the next well in the sequence and begin the process again. A sequence of four wells and one calibration gas will take about sixty minutes to complete. Once the sequence is complete the system will start a new sequence and remain sampling and analyzing for the duration of the project.

Once the system is sampling, a software application running on the computer will export the sample data into summary files describing the sample. Another software application will then look for these summary files on the system and transfer them to a cloud repository. This application continuously looks for newly exported files and when it finds them it initiates the transfer. The communications on the device function from a cellular router. Like the way a cell phone connects to the internet and transfers data to send emails, watch videos, or make phone calls, the cellular router acts as a wide area network and serves as the systems internet connection. Once the summary files are moved to the cloud another software application parses the 20 umary files and transfers the data the proper tables in a relational database. By setting up a remote desktop application, such as Microsoft Remote Desktop or Logmein, the system can be connected to from an internet connection anywhere is the world. Once connected into the system via a remote desktop application a user can initiate a sample analysis sequence, check on the system's settings or even transfer data from the system to the user's computer.

After the data arrives in the cloud relational database it is output into a visualization containing the well, tracers, time and concentration. These data are quality checked, summarized, updated, and immediately released to the ultimate beneficiary via a web API or emailed file. At this point the beneficiary has received a significant number of samples in significantly faster timeframe and can act to manage the reservoir.

The control system for the device works on a series of events preprogrammed into the gas chromatograph commonly referred to as a method. Human machine interface software, such as Agilent's ChemStation, allows the user to program the events of the method. When a sample sequence is started a sample is run according to the method setup for a given length of time. Once that time is up the system will switch to next sample line and repeat the process.

The chemical identity and concentration test results are typically organized and help Inform models of the reservoir into two major categories: Flow profiles and interwell communication.

Figure 16A:
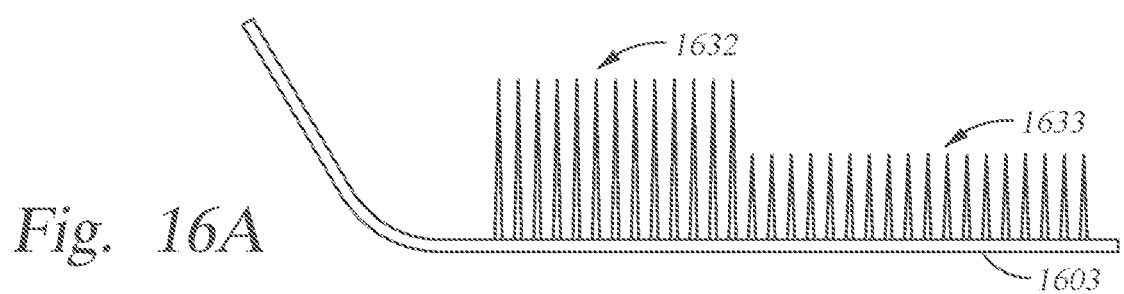
FIGS. 16A and 16B are sectional views of a subterranean formation with well flowing profiles.
Figure 16B:
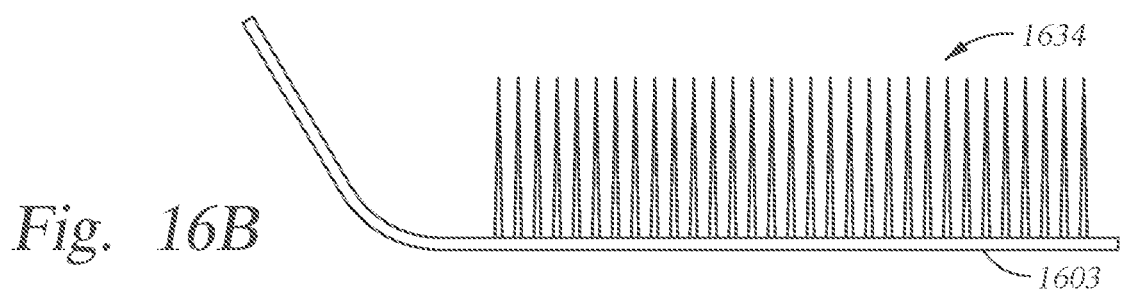

Flow Profiles describe how portions of a well are flowing compared to each other as illustrated by FIGS. 16A and 16B. Profiles can be balanced, all segments in communication with the wellbore are flowing evenly, or non-balanced, such as heel-dominated wellbore 1603, where the heel portion 1632 of a horizontal wellbore 1603 is flowing more than the toe portion 1633 as illustrated by FIG. 16A. Flow profiles can be affected by hydraulic fracture treatment design and execution, changing reservoir geology, physical obstructions inside the wellbore, or reservoir drawdown intensity. They can and will change over time. FIG. 16B shows a balanced flow profile 1634 from a wellbore 1603 through a formation traced with several tracers. These data are invaluable as they inform technical personnel what is affecting the flow of the well, how to address it, and how it changes over time. Since samples are continuously being taken, analyzed and sent to the user in near real time the user can make operational decisions that they couldn't before. Results from samples had historically taken weeks or months. Now which large amounts of sample data coming in within hours an engineer can change the flowing conditions in their well and confirm their effectiveness within hours.

Interwell communication describes how the reservoir fluids flow in relation to wells over time. Tracers pumped in one well and recovered in another implies fluid communication through the reservoir. In secondary recovery operations, long-term well communication is preferred so that the injected fluids sweep more hydrocarbons. In hydraulically fractured wells, interwell communication can describe how the fracture system is propagating through the reservoir and traveling to another well, how natural fracture swarms or faults may magnify communication from one well to another, and how depleted reservoir rock affects fluid travel.

Figure 17:
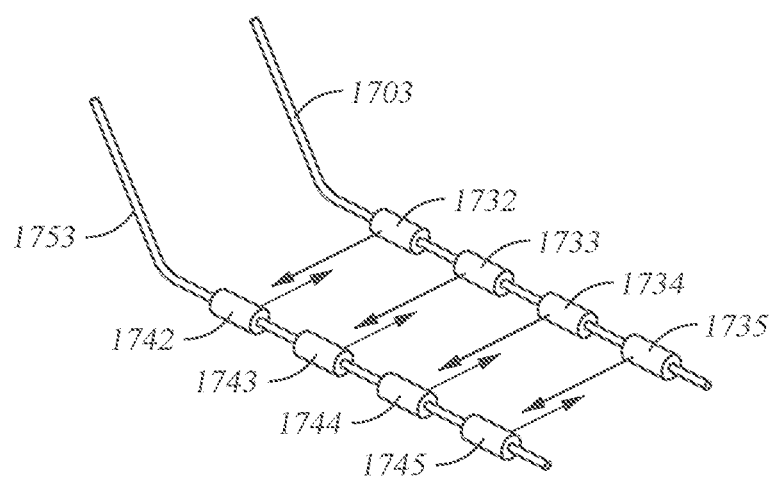
FIG. 17 is a sectional view of a subterranean formation traversed by multiple wellbores.

FIG. 17 shows the interwell communication of two wells each traced with four tracers—wellbore 1703 traced with tracers in regions 1732, 1733, 1734, and 1735 and wellbore 1753 with tracers in regions 1742, 1743, 1744, and 1745. There are large concentrations of the tracers pumped in wellbore 1703 being recovered in wellbore 1753. On the other hand, there are small concentrations of tracers being recovered in wellbore 1703 that were pumped in wellbore 1753. The figure shows the preferential direction of the fluid, wellbore 1703 to wellbore 1753. These data inform the reservoir model for the next set of operations in the area and how to optimize treating the subterranean formation.

Since the system is operating in real time and not delayed waiting for samples being shipped and analyzed in a lab, several actions can be taken that were historically not possible. When optimizing the initial flow of a hydraulically fractured well and its load recovery, flow profiles can be analyzed in real time. For example, for a suite of tracers pumped throughout a horizontal wellbore, the well operator can see in real time if the well is flowing evenly. If it is not, an action can be taken, such as increasing the drawdown, then reviewing the new results from the system to see if even flow has been achieved. FIG. 16A shows a well flowing predominantly from the heel section of the well. Once the well operator made a change to the drawdown the change in the flow profile can be validated with a new sample and data being received in near real time as illustrated in FIG. 16B.

Figure 18:
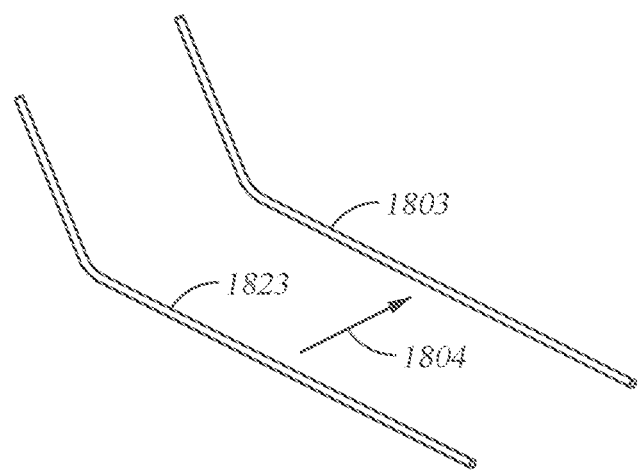
FIG. 18 is a sectional view of a subterranean formation traversed by multiple wellbores.
Figure 19:
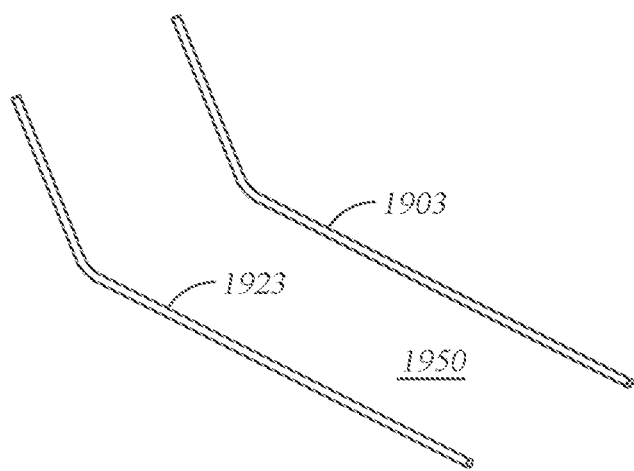
FIG. 19 is a sectional view of a subterranean formation traversed by multiple wellbores.

In the case of a collection of wells in communication with each other the well operator can see with great resolution how the group of wells is connected and to what extent. In the case of an old well and a new well being hydraulically fractured nearby, the well operator can witness the degree of communication the old well is experiencing in real time. The system will allow the well operator to take action to minimize the communication and prevent damage to the old well in real time. FIG. 18 illustrates an old well taking a significant communication hit from a new well being hydraulically fractured. FIG. 18 includes older producing wellbore 1803, newly hydraulically fractured wellbore 1823, and fluid flow arrow 1804 to emphasize flow from the formation surrounding wellbore 1823 to wellbore 1803. FIG. 19 illustrates a subsequent reduction in fluid flow once the well operator makes a change based on the data and reduces the damage to the old well and its connection to the reservoir 1950.

For a field under secondary recovery, it is helpful to see the moment when the tracer begins to breakthrough, i.e., begins to be produced in a producing well. This task becomes much faster and readily observed for a well operator monitoring in real time. When breakthrough does occur, the system can be remotely programmed to sample the producing fluids on a more frequent basis to maximize the resolution of the tracer being produced. In cases in the field where direct connections exist between injectors and producers, i.e., 'short circuits', these problems can be resolved much faster when an instrument is used, ultimately increasing the capital efficiency of the operation. FIG. 20 shows an example of a short circuit in a five-spot pattern water flood. That is, injector wells 2001, 2002, and 2003 have routine flow into the formation surrounding producing wellbore 2005 while injector wellbore 2004 has a short circuit 2006 in the flow in the formation is shares closest to producing wellbore 2005. The well operator can resolve this problem by shutting in the short circuiting well as shown in FIG. 21. FIG. 21 shows injector wells 2001, 2002, and 2003 provide routine flow into the formation surrounding producing wellbore 2103, but wellbore 2101 is shut in to prevent any short circuit distorting the flow into wellbore 2103. Once the short circuiting well is shut in data gathered in real time will validate the action taken by the well operator.

Case Study 1

Figure 23:
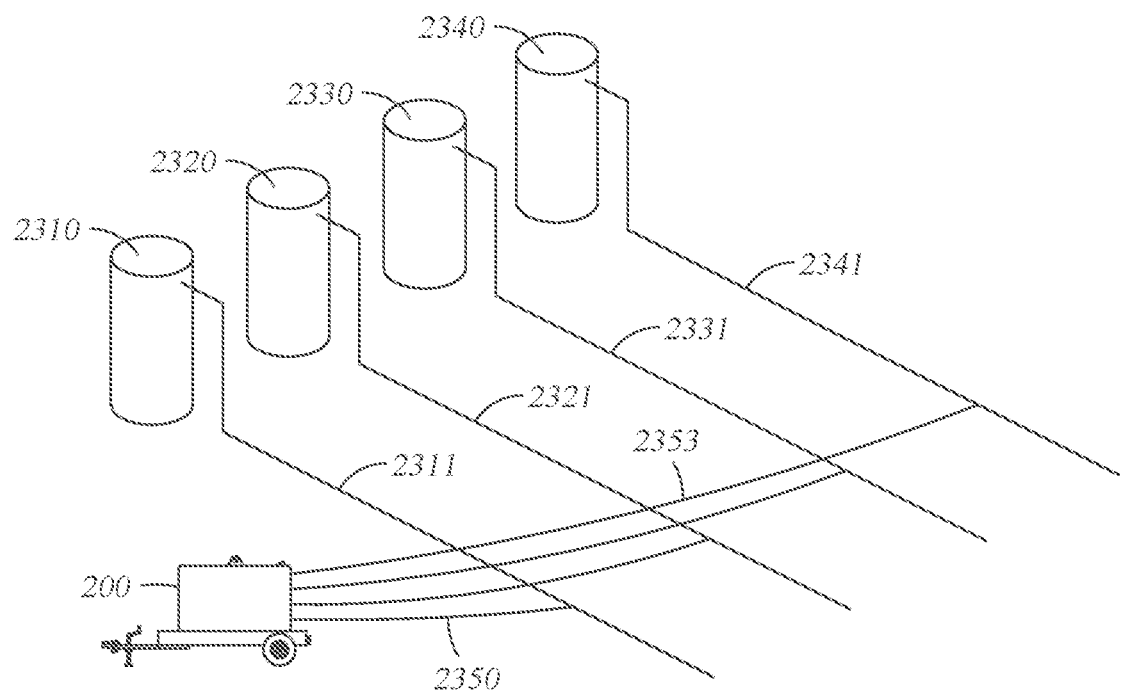
FIG. 23 is a dimensional view of a diagnostic system in communication with flowlines and wellheads of an embodiment related to case study 1.

A well operator owned the rights to hundreds of feet of oil and gas minerals in one of their fields. They were typically drilling and producing from the deepest pay zone and wanted to investigate a pay zone fifty feet shallower. Their objective was to evaluate both pay zones simultaneously and to determine whether both pay zones were separate reservoirs. FIGS. 22 and 23 show how the well operator drilled two wellbores 2223 and 2233 in the deeper part of the pay zone and two wells 2213 and 2203 in the shallower pay zone directly stacked on top of each other. Each well was spaced a distance 2260 of about one thousand feet apart laterally and a distance 2261 of about fifty feet apart vertically. The well operator ran tracers in both deeper wellbores 2223 and 2233 and used the diagnostic system 200 to sample all four wells for communication of the tracers. The diagnostic system 200 was placed alongside the wells' tubing 2321, 2321, 2331, and 2341, a distance 2353 of approximately 20' from the farthest tubing 2341 and a distance 2350 of about 3' from the closest tubing 2311. FIG. 23 also shows wellheads 2310, 2320, 2330, and 2340. The diagnostic system provided a robust data set of thousands of samples over a thirty day period to clearly conclude that the shallower pay zone traversed by wellbores 2203 and 2213 was indeed its own reservoir. Tracers were injected into the treatments wells during the hydraulic fracturing treatments over three weeks. Then each well was cleaned out and prepared for production over seven days. Flowback operations and began dewatering the wells over two days. The diagnostic system was brought in twenty four hours before initial gas and hooked up to the wells. At first gas sampling was started and was run continuously for thirty days. Each day the data was analyzed and given to the operating company's engineering team. After three weeks of sampling the results were reviewed with the operating company's engineering team to discuss the results and prepare recommendations for the operating company's executive time. An additional week of sampling was completed before the device was rigged down and mobilized to the next project. Discovering a new reservoir is of significant value to a well operator. Not only does it increase the intrinsic value of the firm but it allows the well owner to monetize the value much faster. By knowing and validating the presence of a new reservoir the well operator can begin making changes to their development schedule, raw materials needs and pipeline capacities. As payout schedules, capital requirements and contract negotiations are all driven by time gaining time from something that used to take months is significant.

Case Study 2

Figure 24:
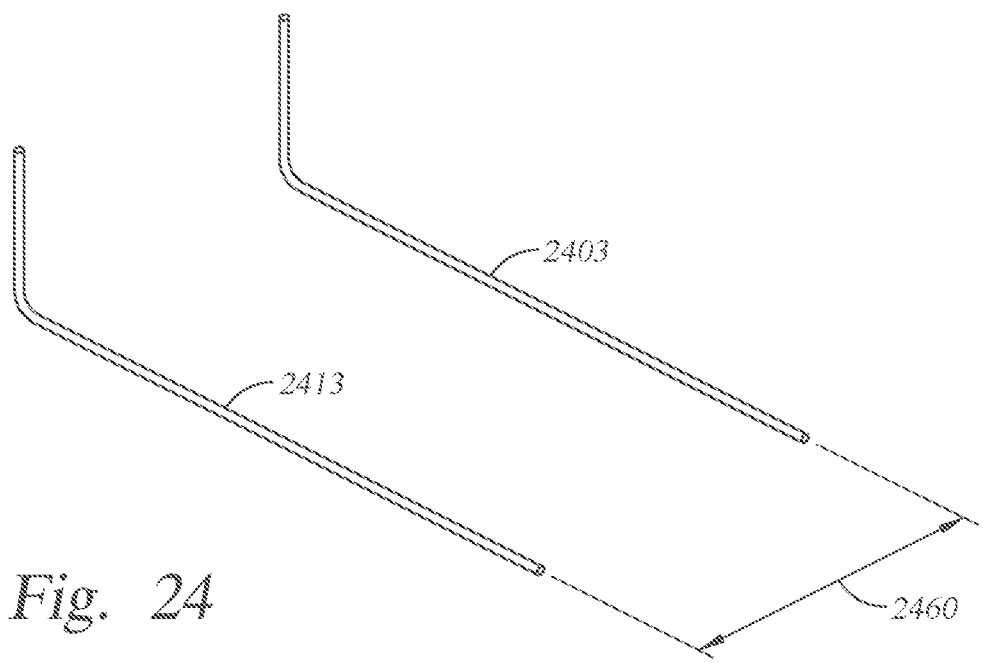
FIG. 24 is a sectional view of two wellbores of an embodiment related to case study 2.
Figure 25:
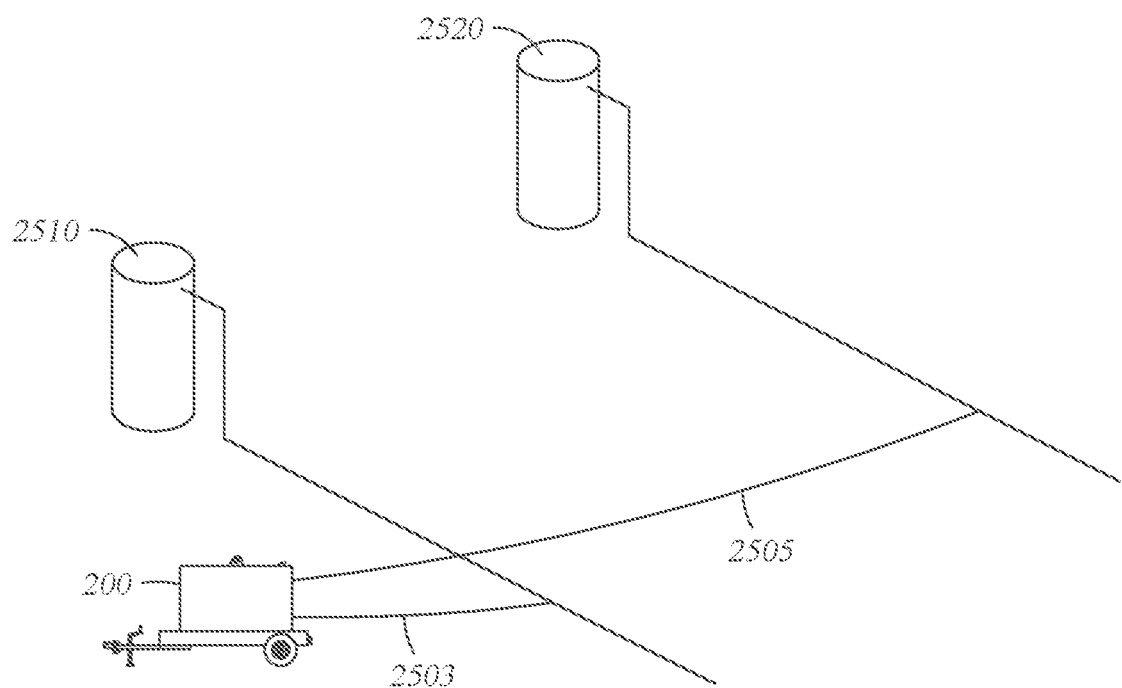
FIG. 25 is a dimensional view of a diagnostic system in communication with flowlines and wellheads of an embodiment related to case study 2.

Similar to Case Study 1, another well operator wanted to determine the lateral spacing of their wells where they would not experience reservoir communication during normal operating conditions. FIGS. 24 and 25 illustrate the well operator ran tracers in a new wellbore 2413 drilled in the area and sampled both a new wellbore 2413 and an old wellbore 2403 with the diagnostic system. The wellbores were a distance 2460 of about 2000 feet apart. The diagnostic system 200 was placed alongside the new wellhead 2510, a distance 2503 of about 2 feet away and a distance 2505 of about 30 feet away from the old wellhead 2520. It was confirmed over hundreds of samples that both wells were not in communication with each other. Several shut in tests were then conducted when one well was shut in and the other left flowing. In these cases, communication was observed between the wells. The near real time capability of the diagnostic system allowed the operator to observe a change in communication in real time and confirm the data with hundreds of samples. This information informs the reservoir model which drives future field development plans. Reservoir properties such as fracture half length, drainage area and effective surface contact can be used in reservoir engineering models to optimize development. By knowing how the reservoir interacts among a group of wells the next fifty wells can be optimally planned and executed. By speeding up the learning process which used to take months using physical samples, the well owner can proceed with greater confidence in their well density, capital requirements, and raw materials needs.

Case Study 3

Figure 26:
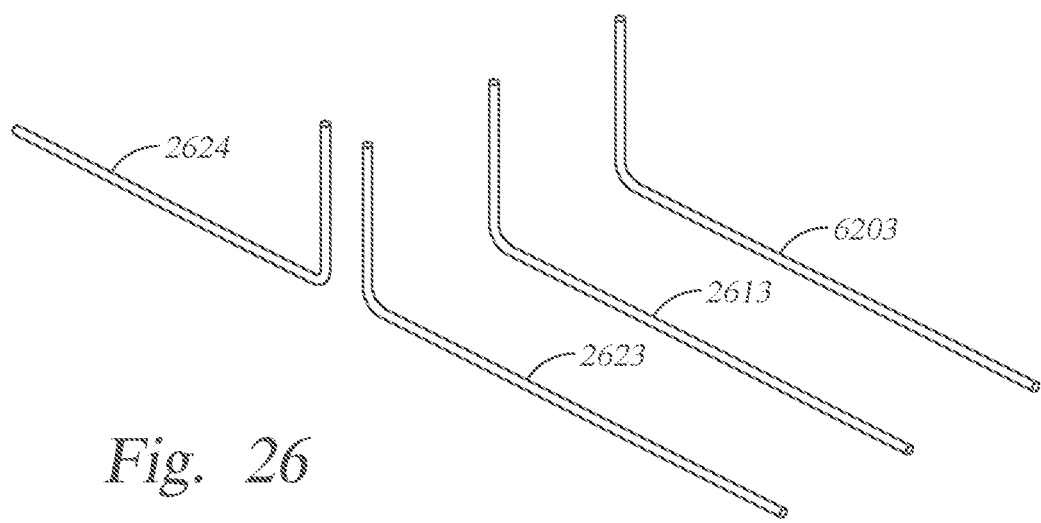
FIG. 26 is a sectional view of a few wellbores of an embodiment related to case study 3.
Figure 27:
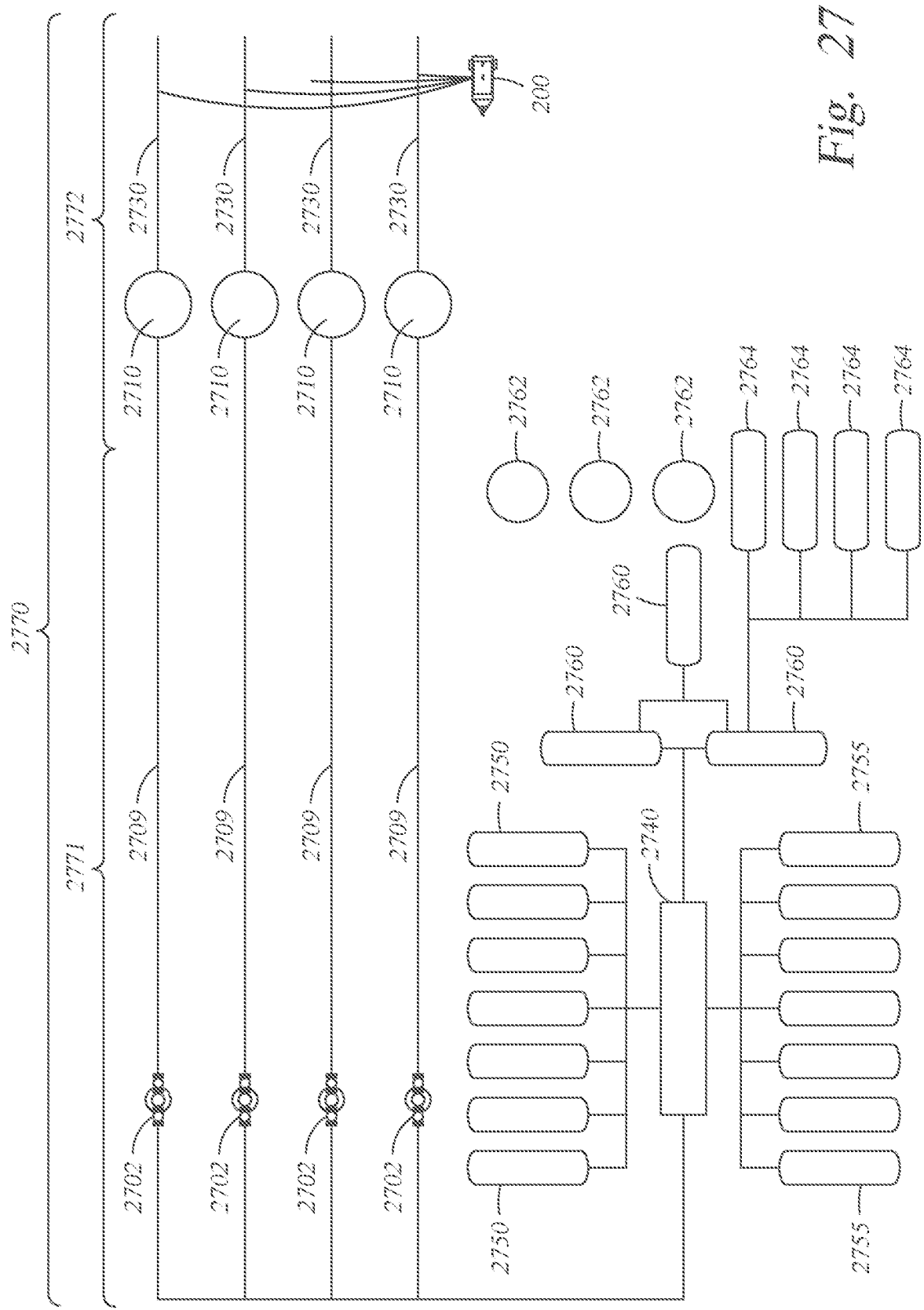
FIG. 27 is a dimensional view of a diagnostic system in communication with flowlines and wellheads of an embodiment of case study 3.

An operator was concerned about an old well among a group of new wells during completions operations as illustrated by FIGS. 26 and 27. To avoid shutting in the old wellbore 2624 and foregoing its production for forty to sixty days, costing the operator time and production delays, the operator chose to monitor the old wellbore 2624 with the diagnostic device. By pumping tracers in the new wellbores 2623, 2613, and 6203 as they are being completed and sampling the old wellbore 2624 with the diagnostic device the operator could shut in the old well fast enough to avoid damaging it and avoid lost production during operations. FIG. 27 shows the diagnostic system 200 placed a distance about 5 feet away from the separators 2710 via tubing 2730 with a frac fleet 2771 conducting hydraulic fracturing operations at the same time on the wellsite 2770. Tubing 2709 from the wellheads 2702 connects the flow from the wellheads to the separators 2710. The diagnostic system 200 has a small enough footprint 2772 that it can easily coexist during well service operations that require about 30 53' long, 8.5' wide and 8.5' high tractor trailers such as pump trucks 2750, missile 2740, multiple water holding tanks 2760 of roughly the same dimensions, large sand silos 2762 which can be 20' in diameter and 60' feet high and 25 ancillary pieces of equipment such as chemical mixing and storage containers 2764 (the pipe, tubing, flexible pipe, and connectors generally connecting the flow of fluid from this equipment to the wellheads 2702 changes across the life of the work at the wellsite for delivering fluid into the wellheads 2702, it is pictured in an inexact, general arrangement in FIG. 27 for context information only.). Thousands of samples were taken with the diagnostic device 200 from the tubing 2730 from wellheads 2702, and the sample test results clearly showed that the old well was not impacted by the new wells. After the real time monitoring of the old wellbore 2604 the operator switched to monitoring reservoir communication among the new wellbores 2601, 2602, and 2603. After thousands of samples from continuous monitoring the operator had a clear sense of the reservoir communication among a group of new and old wells and a framework for development and operations for other parts of the field.

Case Study 4

Figure 28:
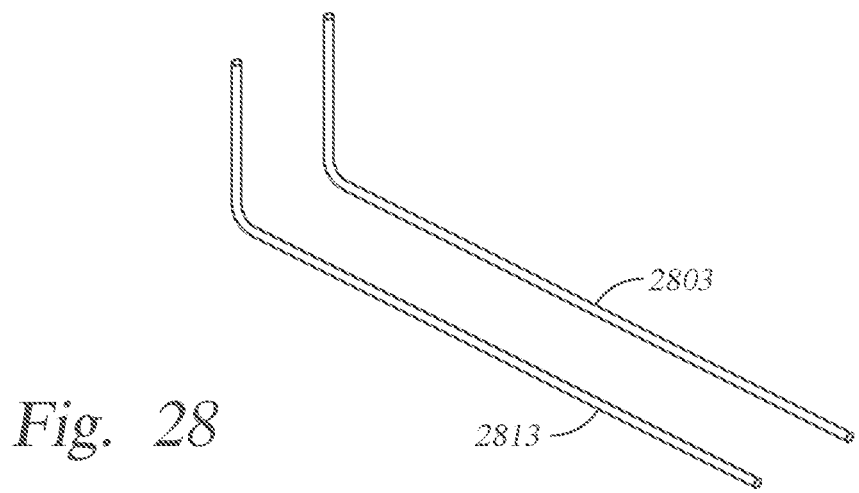
FIG. 28 is a sectional view of two wellbores of an embodiment related to case study 4.
Figure 29:
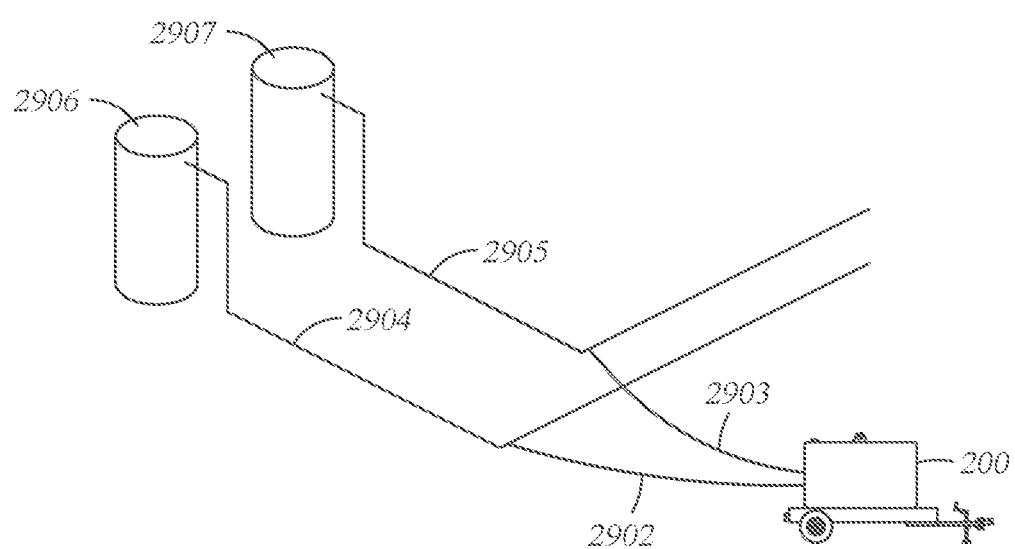
FIG. 29 is a dimensional view of a diagnostic system in communication with flowlines and wellheads of an embodiment of case study 4.

An operator wanted to evaluate the drilling of two horizontal wellbores 2803 and 2813 as shown in FIG. 28 and the affects of trajectory changes on production. The operator ran tracers on both wellbores 2803 and 2813 and sampled over thirty days with thousands of samples. FIG. 29 shows the diagnostic system 200 was placed a distance 2902 of about 15' away from the tubing 2904 and a distance 2903 of about 15 feet away from tubing 2905 from wellheads 2906 and 2907. It became clear to the operator that the well with less changes in trajectory was the better producer. This lesson learned could be immediately applied to the drilling of new wells without the need for a second or third validation project because of the robustness of the diagnostic system and volume of data it produced.

We claim:

1. A method for characterizing and communicating chemical tracer presence in a subterranean formation traversed by a wellbore, comprising:
    collecting fluid from the wellbore at a wellhead;
    analyzing the fluid for the presence or concentration or both of the tracer using a gas chromatograph connected to a line collecting the fluid from the wellhead; and
    communicating the gas chromatograph analysis information within 24 hours of analyzing the fluid; and
    controlling the collecting, analyzing, and communicating using a controller,
    wherein the collecting fluid comprises an autonomous system, wherein the autonomous system comprises a multiplex valve that controls for multiple inputs.

2. The method of claim 1, further comprising introducing the tracer before collecting the fluid.

3. The method of claim 1, wherein the tracer is a perfluorocarbon.

4. The method of claim 1, wherein the collecting fluid is continuous.

5. The method of claim 1, wherein the collecting fluid comprises conditioning a flow of fluid.

6. The method of claim 1, wherein the multiple inputs comprise time, wellhead identity, calibration, signals from the gas chromatograph or the controller, or a combination thereof.

7. The method of claim 1, wherein the analyzing further comprises analyzing for the concentration of the tracing chemical.

8. The method of claim 1, wherein the gas chromatograph measures the fluid from the wellbore after a conditioning activity.

9. The method of claim 8, wherein the conditioning activity comprises fluid composition, fluid gas to liquid ratio, time between analyzing, phase separation, temperature control, pressure control, or a combination thereof.

10. The method of claim 1, wherein the gas chromatograph has a line in direct communication with the wellbore.

11. The method of claim 1, wherein the communicating comprises a transmitter to transmit a signal to a remote device.

12. A method for monitoring the presence of a chemical tracer in a fluid produced from a wellbore, comprising;
    continuously collecting and conditioning a sample line from a wellbore;
    analyzing the sample line with a gas chromatograph at a wellsite;
    recording information from the analyzing continuously over time; and
    controlling the collecting, conditioning, analyzing, and recording with a process control device; and
    wherein the collecting the sample line comprises an autonomous system,
    wherein the autonomous system comprises a multiplex valve that controls for multiple inputs.

13. The method of claim 12, wherein the process control device is a microprocessor.

14. The method of claim 12, wherein the controlling further comprises communicating the information to a remote location.

15. The method of claim 14, wherein the collecting, conditioning, analyzing, recording, and communicating occur within 10 minutes.

16. The method of claim 15, wherein the collecting, conditioning, analyzing, recording and communicating are repeated continuously over 24 hours.

17. The method of claim 12, wherein the controlling further comprises adjusting a heater or air conditioner.

* * * * *